US012793068B1

(12) United States Patent
Witteman et al.

(10) Patent No.: US 12,793,068 B1
(45) Date of Patent: Nov. 10, 2026

(54) SYSTEMS AND METHODS FOR DECENTRALIZED IDENTITY REGISTRATION AND VERIFICATION

(71) Applicants: Bradley James Witteman, Vancouver, WA (US); Robert Hunter Reid, San Diego, CA (US)

(72) Inventors: Bradley James Witteman, Vancouver, WA (US); Robert Hunter Reid, San Diego, CA (US)

(73) Assignee: Everest Network Ltd, Swatar (MT)

( * ) Notice: Subject to any disclaimer, the term of this patent is extended or adjusted under 35 U.S.C. 154(b) by 0 days.

(21) Appl. No.: 16/409,457

(22) Filed: May 10, 2019

Related U.S. Application Data

(60) Provisional application No. 62/669,875, filed on May 10, 2018.

(51) Int. Cl.

*G06Q 20/40* (2012.01)
*G06Q 20/02* (2012.01)
*G06Q 20/38* (2012.01)

(52) U.S. Cl.

CPC ..... *G06Q 20/40145* (2013.01); *G06Q 20/027* (2013.01); *G06Q 20/3829* (2013.01); *G06Q 20/389* (2013.01); *G06Q 2220/00* (2013.01)

(58) Field of Classification Search

CPC ........... G06Q 20/40145; G06Q 20/027; G06Q 20/3829; G06Q 20/389
See application file for complete search history.

(56) References Cited

U.S. PATENT DOCUMENTS

| | | | | | |
|---|---|---|---|---|---|
| 9,992,022 | B1 * | 6/2018 | Chapman | G06F 21/604 | |
| 2010/0100632 | A1 * | 4/2010 | Qureshi | H04L 63/105 | 709/229 |
| 2014/0244496 | A1 * | 8/2014 | Langus | G06Q 20/409 | 705/41 |
| 2015/0365283 | A1 * | 12/2015 | Ronca | H04L 67/12 | 705/71 |
| 2017/0046806 | A1 * | 2/2017 | Haldenby | G06Q 10/08 | |
| 2018/0144153 | A1 * | 5/2018 | Pead | G06F 21/6245 | |
| 2018/0285839 | A1 * | 10/2018 | Yang | G06Q 20/40 | |
| 2019/0082416 | A1 * | 3/2019 | DeLuca | H04W 68/12 | |
| 2019/0228178 | A1 * | 7/2019 | Sharma | G06K 19/06037 | |

* cited by examiner

*Primary Examiner* — Scott C Anderson

(74) *Attorney, Agent, or Firm* — Law Offices of J. Curtis Edmondson; J. Curtis Edmondson

(57) ABSTRACT

Described is a method for registering and verifying a registered user identity for access to transaction with different service providers. The method includes receiving, at a transaction gateway, a communication associated with a transaction initiated by a registered user, the communication including one or more requests, each of the requests associated with a transaction service, determining, at the transaction gateway, the communication includes an identity verification request to verify encoded data obtained from an identification presented by the registered user, routing the identity verification request to an identity verification portal, wherein the identity verification service comprises a processing unit, memory, a communications interface and one or more software programs, wherein the identity verification portal receives the identity verification request and receiving, at the transaction gateway, a result from the identity verification portal, the result including authenticating the identification of the registered user; and communicating the result to the transaction gateway.

15 Claims, 21 Drawing Sheets

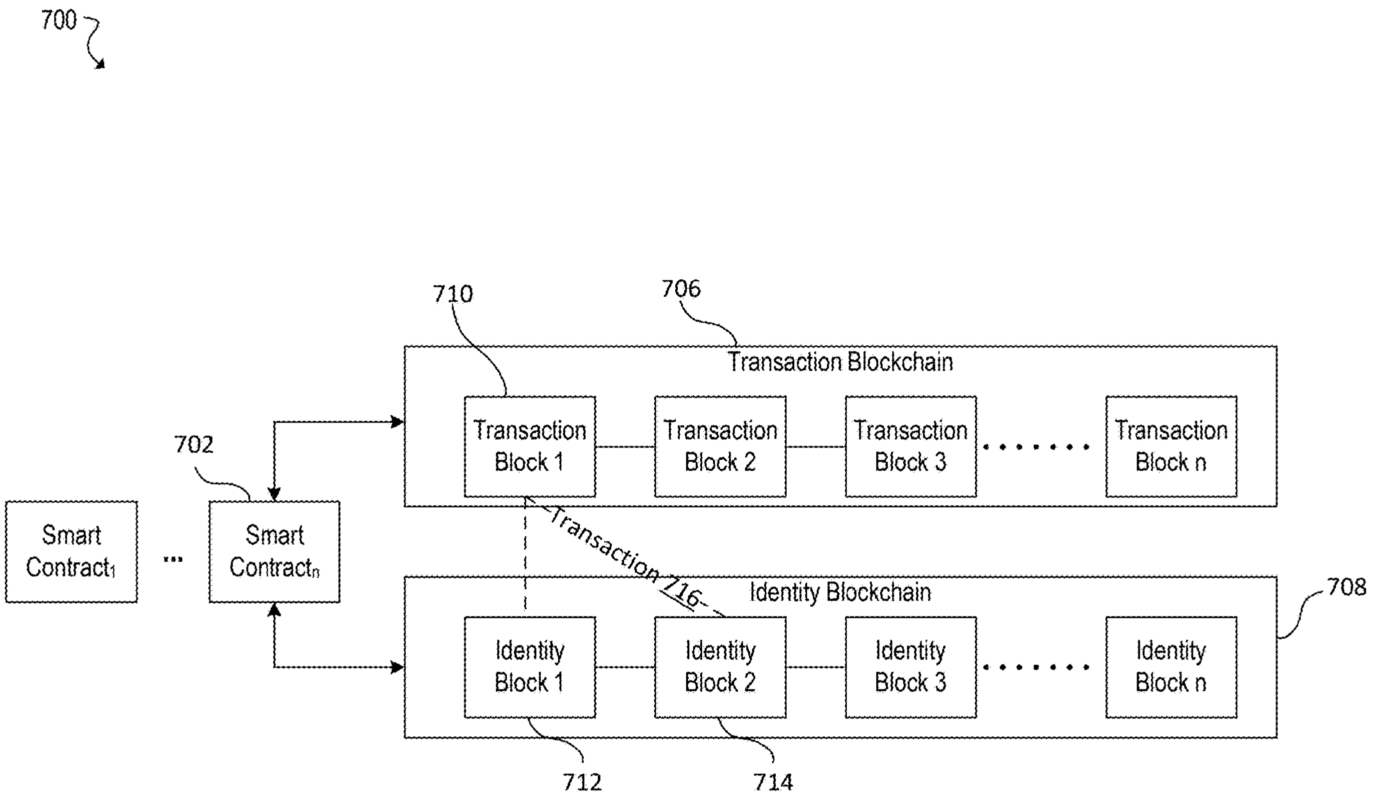
Fig. 7 illustrates a block diagram 700 of a transaction 716 between two parties that is completed by a smart contract. A smart contract 702 comprises

SYSTEMS AND METHODS FOR DECENTRALIZED IDENTITY REGISTRATION AND VERIFICATION

CROSS REFERENCES TO RELATED APPLICATIONS

This application claims the benefit of U.S. Provisional Patent Application No. 62/669,875, filed May 10, 2018, entitled as "Systems and Methods for Decentralized Identity Registration and Verification", which is incorporated herein by reference in its entirety.

FIELD

The present inventions relate generally to managing digital identities and, more specifically, systems and methods for registering digital identities, validating digital identity origin and ownership, and tracking and publishing digital identity related data for facilitating secure financial and government transactions.

BACKGROUND

An identity verification protocol is used by businesses, financial and government institutions to ensure that users or customers provide information that is associated with the identity of a real person. The protocol may verify the authenticity of physical identity documents such as a driver's license or passport, called documentary verification, or may verify identity information against authoritative sources such as a credit bureau or government data, called non-documentary verification. The protocol ties these points of documentary and non-documentary verification to the biometry, or unique physical characteristics, of an individual. A value exchange for the physical identity resulting in relationships, bank transactions, contracts would be based on "trust", and "trust" is based on verifying the authenticity of the identity.

A non-documentary identity verification requires the user or customer to provide personal identity data which is sent to the identity verification service. The service checks public and private databases for a match on the information provided. Optionally, knowledge-based authentication questions can be presented to the person providing the information to ensure that he or she is the owner of the identity.

Customers of various businesses, such as retail merchants, government entities or financial institutions, are often required to present an identification to complete a transaction. For instance, a merchant may require customer identification for various types of purchases (e.g., alcohol, lottery or tobacco purchases) or when certain types of payments (e.g., checks, credit cards) are presented to pay for transactions. Financial institutions usually require customers to present an identification to complete a withdrawal or deposit transaction, cash a check, or open a new account. Government entities may require identification for access into secure areas or other purposes. Other businesses may also require identification from customers.

U.S. Pat. No. 6,553,494 (Glass) describes a method and apparatus to assist a person to sign an electronic document using a personal biometric. A sample of biometric data is collected from the person at the time of the signing of the document and encrypted with the document itself and various other data to form a digital signature. The encryption technique utilized irrefutably couples the biometric data with the document. To authenticate the coupling, an authenticator signature is generated using the original data and is then compared with the original signature to verify a match there between. The transparency of the system is limited.

U.S. Pat. No. 8,190,904 (Hatter et al.) describes a remote electronic notarization system for remote electronic verification, authentication and screening of potential signatories for remote electronic notary transactions via a remote personal computer encrypted platform that communicates over a digital broadband or WiFi cellular/PDA device or portable personal computer device. The system can reach a smaller population regions. EP 2460307 (Williams et al.) discloses a system and methods for strong remote identity proofing, obtaining biographical information from the individual, and using this information to search public data repositories. No claims related to obtaining biographical information to search data depositories for identities are made herein.

EP 1130491 (Corella et al.) discloses a method for structuring a digital certificate comprised of multiple authorization hashes that a relying party can use to access relevant authorization information. A filter, mask or hash authorization data is created that can be relied by third parties can use to make authorization decisions, which gives several opportunities to manipulate the data.

U.S. Pat. No. 7,310,734 (Boate et al.) discloses an improved network security system, methods and a personal identifier device, used to control network access and real time authentication of a user's identity and presence at a particular network access point. Biometric verification and cryptography is provided on-board the portable personal digital identifier device to provide authenticated digital signatures which are used for establishing secure access to data stored on a network and for performing secure transactions over a network. The user persistence and user authentication protocols are not expressly enforced.

With the continued proliferation of mobile devices and readily available cloud storage, digital identity may be possible. A digital identity of a person includes all information that identifies a person in the electronic digitized world. Verification and authentication of this digital identity is essential to prevent data breaches, fraud and hacking. However, there can be variety of issues that are associated with digital identities. One of the associated problems is fraud and leakage, which is linked to the amount of information that is lost by miss-reported data. Another issue is the maximum amount of people that can be reached with the minimum cost for an associated technology. Reliable, scalable identity verification continues to be challenge for those in need with or lacking access to modern mobile devices.

One of the challenges regarding digital identity verification is strengthening identity verification while expanding options for remotely verifying identity. In the ideal world, identity verification should be secure and available to everyone, even the people with no record or a bank account, which accounts for almost half of the world's population and about few trillion of the world economies. All economic activity is based upon identity verification, since value is exchanged upon trust, and trust is based upon correctly verifying the identities. The challenges of identity verification for all, even the unrepresented users, can be tackled by using or modifying various technologies.

SUMMARY

Methods, systems, and machine-readable mediums are disclosed for verifying customer identifications. In one embodiment the method involves receiving, at a transaction gateway, a communication associated with a transaction initiated by a registered user, the communication including one or more requests, each of the requests associated with a transaction service, determining, at the transaction gateway, the communication includes an identity verification request to verify encoded data obtained from an identification presented by the registered user, routing the identity verification request to an identity verification portal, wherein the identity verification service comprises a processing unit, memory, a communications interface and one or more software programs, wherein the identity verification portal receives the identity verification request, receiving at the transaction gateway, a result from the identity verification portal, the result including authenticating the identification presented by the registered user; and communicating the result to the transaction gateway and wherein the transaction gateway is operable to route a plurality of the requests from plurality of registered user to plurality of service providers.

In further embodiments, the method may comprise communicating a result regarding validation of the identification presented by the registered user and facilitating the request associated with the transaction service.

In further embodiments, the method may comprise communicating a result regarding a non-validation of the identification presented by the registered user and reporting of fraudulent request.

Blockchain is the data and record-tracking technology behind Cryptocurrencies. This technology offers enormous value and utility regarding ownership of currencies and commodities in the electronic digitized world, and identity verification can be optimized through the usage of the smart contracts that this technology offers. Individual's data and identity is immutable when it's supported by Blockchain technology because the data will not have a centralized point of vulnerability.

In response to the concerns discussed above with the various art, there is a need for better systems and methods for registering digital identities, validating digital identity origin and ownership, and tracking and publishing digital identity related data for facilitating secure financial and government transactions.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: receiving, at a transaction gateway, a communication associated with a transaction initiated by a registered user, the communication including one or more requests, each of the requests associated with a transaction service. The method also includes determining, at the transaction gateway, the communication includes an identity verification request to verify encoded data obtained from an identification presented by the registered user. The method also includes routing the identity verification request to an identity verification portal, where the identity verification portal includes a processing unit, memory, a communications interface and one or more software programs, where the identity verification portal receives the identity verification request. The method also includes receiving, at the transaction gateway, a result from the identity verification portal, the result including authenticating the identification presented by the registered user; and communicating the result to the transaction gateway. The method also includes where the transaction gateway is operable to route a plurality of the requests from the registered user to plurality of service providers. Other embodiments of this aspect include corresponding computer systems, apparatus, and computer programs recorded on one or more computer storage devices, each configured to perform the actions of the methods.

Implementations may include one or more of the following features. The method where the result includes a validation of the identification presented by the registered user and facilitating each of the requests associated with the transaction service. The method where the result includes a non-validation of the identification presented by the registered user and reporting of fraudulent request. Implementations of the described techniques may include hardware, a method or process, or computer software on a computer-accessible medium.

One general aspect includes a method including: receiving, by one or more super node servers in a decentralized distributed network, a verification request for verification data of a user from a third party. The method also includes where the verification request includes a seed information regarding the user. The method also includes sending, by the one or more super node servers, a permission request to one or more device nodes, where the permission request includes asking the one or more device nodes for permission to share the verification data based on the seed information. The method also includes responsive to receiving an approval from the one or more device nodes to share at least a portion of the verification data, the one or more super node servers sends at least the portion of the verification data to the third party. Other embodiments of this aspect include corresponding computer systems, apparatus, and computer programs recorded on one or more computer storage devices, each configured to perform the actions of the methods.

Implementations may include one or more of the following features. The method may also include further including receiving, by the one or more super node servers, at least one identification information from the user. The method may also include further including receiving, by the one or more super node servers, at least one government identification information about the user from government issued documents. The method may also include further including receiving, by the one or more super node servers, at least one non-government identification information about the user from non-government issued electronic accounts. The method may also include further including storing the at least one identification information, the at least one government identification information and the at least one non-government identification information on a distributed blockchain network on the one or more super node servers and the one or more device nodes. The method. The method may also include where the at least one identification information includes at least one of biometric information, name, address, phone number, social media identifier, personal identification number, photographs of the user. The method may also include where the at least one government identification information include at least one of passport, driver license, birth certificate, graduation certificate. The method may also include where the at least one non-government identification information includes online network information, online retailer information. The method where the verification request includes at least one of the identification information and at least one of the government identification information; The method further including: upon detecting that the one or more device nodes is located away from a first super node server of the one or more super node servers to be closer in distance to a second supernode server of the one or more super node servers, transferring the at least one identification information, the at least one government identification information, and the at least one non-government identification information to the second super node server. The method where the seed information includes a name the user and a public key of the user. The method further including sharing, by the one or more super node servers the verification data upon receiving the approval from the one or more device nodes. The method further including generating a display on the one or more device nodes a selectable summary of the verification data to permit the user to approve or disapprove a sharing of the verification data. The method further including at least one board member server that validates user information that corresponds to each board member server information in the one or more super node servers and the one or more device nodes. The method further including a transaction blockchain that includes multiple immutable nodes that each include transaction information. The method further including an identity blockchain that includes multiple identity nodes each identity node including: at least one identification information from the user; at least one government identification information about the user from government issued documents. The method may also include at least one non-government identification information about the user from non-government issued electronic accounts. The method where the transaction information includes a link to at least two nodes in the identity blockchain. The method further including a transaction distributed network block chain including multiple immutable transaction nodes that each include transaction details that were generated by a smart contract. Implementations of the described techniques may include hardware, a method or process, or computer software on a computer-accessible medium.

One general aspect includes a method for verifying an identity of a user, the method including: receiving, by one or more super node servers in a distributed network, a verification request for verification data of the user from a third party. The method also includes where the verification request includes a seed information of the user. The method also includes verifying that the seed information was provided by the user based on an information within the verification request. The method also includes upon verifying that the seed information was provided by the user sending the verification data to the third party such that the verification data is encrypted to be decrypted by the user. Other embodiments of this aspect include corresponding computer systems, apparatus, and computer programs recorded on one or more computer storage devices, each configured to perform the actions of the methods.

Implementations may include one or more of the following features. The method where the verification request includes a current image of the user that includes a geolocation information about the user. The method where the verification request includes a personal identification number of the user. The method where the verification request includes a fingerprint of the user. Implementations of the described techniques may include hardware, a method or process, or computer software on a computer-accessible medium.

BRIEF DESCRIPTION OF THE DRAWINGS

The following figures show embodiments according to the inventive subject matter.

FIG. 7 is a network between the smart contracts, the transaction blockchain, and the identity blockchain.

DETAILED DESCRIPTION

Figure 1:
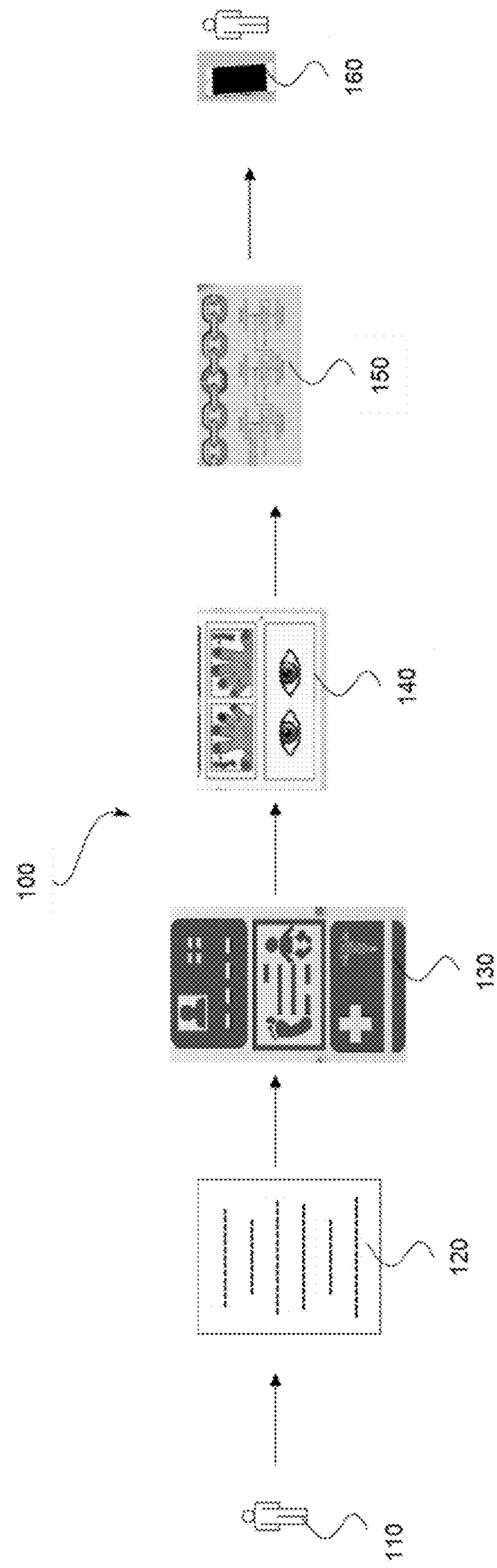
FIG. 1 is a registration process flow chart.

Before turning to the figures which illustrate the exemplary embodiments, it should be understood that the application is not limited to the details or methodology set forth in the following description or illustrated in the figures. It should also be understood that the phraseology and terminology employed herein is for the purpose of description only and should not be regarded as limiting.

Representative embodiments according to the inventive subject matter are shown in FIGS. 1 to 4, wherein similar features share common reference numerals. The specific embodiments are meant to be illustrative and not limit the scope of the present disclosure and the various ways it may be embodied.

Referring to FIG. 1, FIG. 1 is a process flow for registration of a user 110 is described. An agent registers a user 110 to the digital identity management portal. The agent collects and enters all the new user related personal data such as, name, age, date of birth, gender, family members and their details, employer details, and information regarding social network subscriptions and connections 120. Further the agent scans and uploads 130 physical documents like national ID, birth record, medical record of the new individual to the digital identity management portal. The next step includes to take a photo of the new user 140, which serves as a photo identity for photo identification protocols and scanning the biometrics like fingerprints and iris scanning of the new user for biometric identities for biometric identification protocols. The software on the digital identity management portal is equipped to encrypt all the data collected from each and every new user into a block chain based on identity super node 150. The new user 110 has access and control to his/her data saved on the digital identity management portal via his/her electronic mobile device 160, however upon registration with the portal the data can be selectively accessed by integrated partner organizations.

Figure 2:
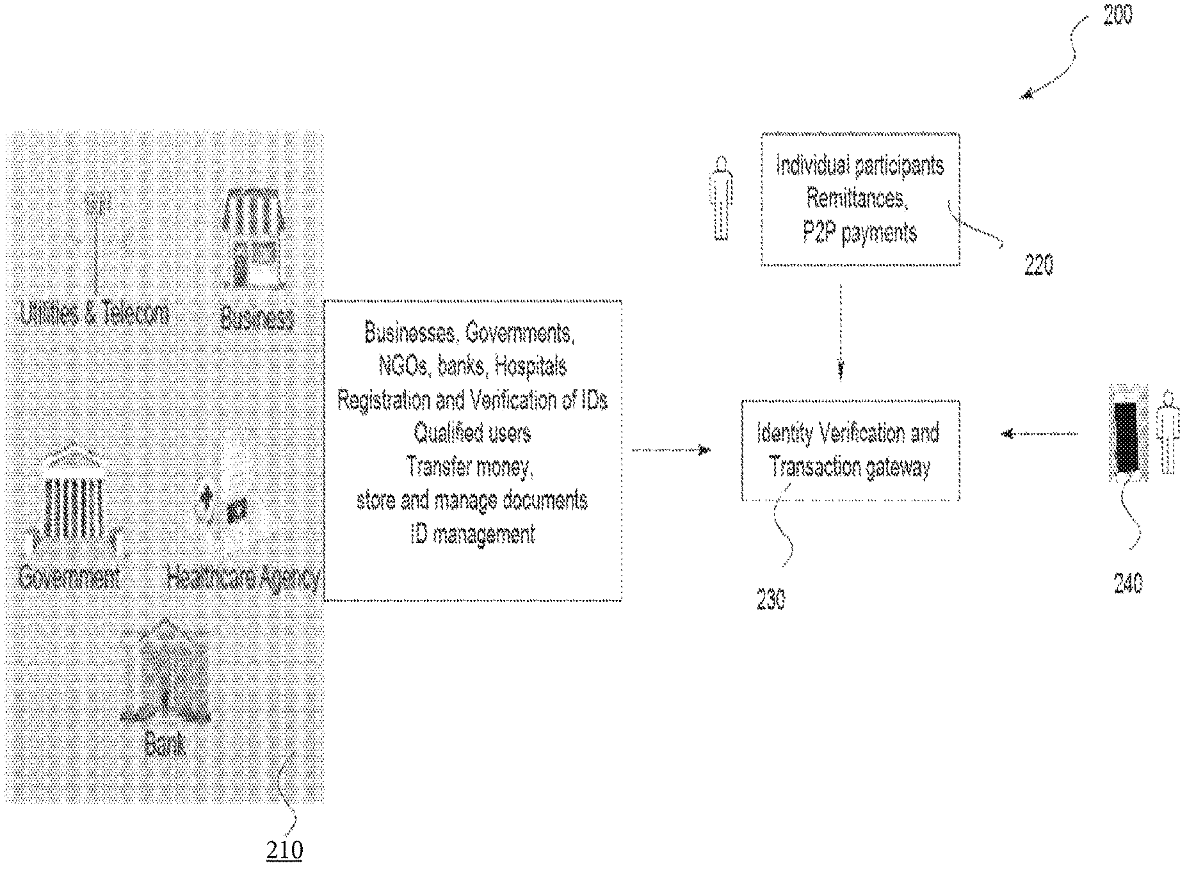
FIG. 2 is a network for the identity verification and transaction gateway.

Referring to FIG. 2, FIG. 2 illustrates a network 200 for an identity verification. Different types of institutions 210 including, small and large businesses, government institutions, non-government institutions, banking and financial institutions, medical and healthcare organizations are equipped for facilitating user's identity verification and for serving the user with the desired service upon authentication of the user identity.

The individual participants 220 may perform basic transactions of remittances and P2P payments by accessing their accounts on the digital identity management portal. User 110 has the liberty to give permissions to different transactions and edit the permissions at any given point of time via the identity verification and transaction gateway 230.

Figure 3:
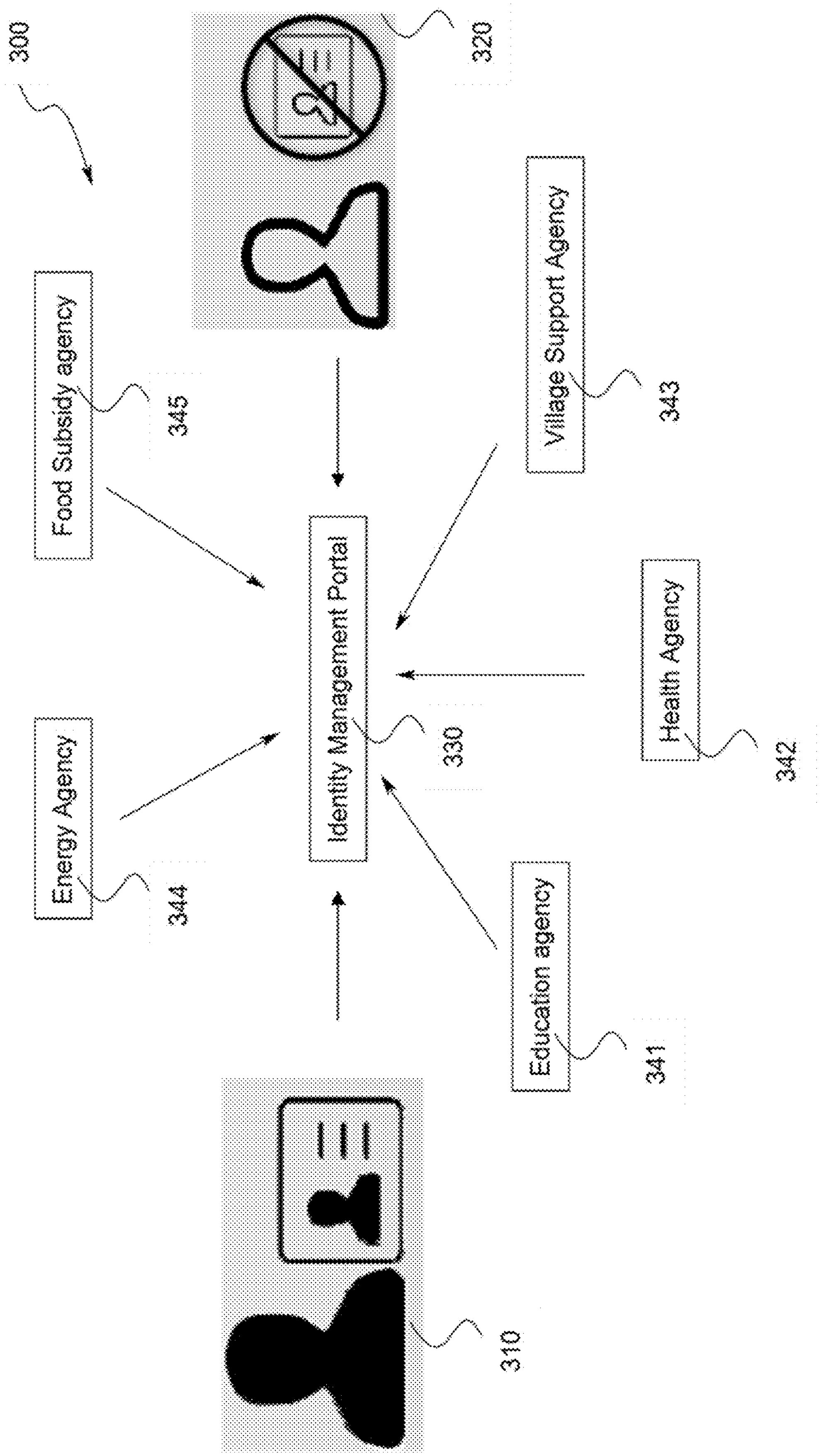
FIG. 3 is a description of identity management portal.

Referring to FIG. 3, FIG. 3 illustrates an identity management portal 330 as a base for managing different transactions between the users and service providers. An existing user 310 information is trackable and/or definitive and provides the details of the existing user and his preferred permissions for accessing the different services. New users 320 are registered into the system by user self-registration or by an agent by collecting the registration information with the user. The registration information includes biometric samples of the user, any available documents and/or verifying information via social attestations.

An education agency service provider 341 can facilitate the delivering of necessary stipend for education of its users registered on the identity management portal 330. A health agency service provider 342 can facilitate the medical record transaction and medical insurance details between the healthcare facilities and the users. A village support agency service provider 343 can facilitate conditional cash transfer transaction between the registered users and the village financial institutions. An energy agency service provider 344 can facilitate a distribution of energy subsidy to needy people. A food subsidy agency 345 can facilitate the distribution of rice subsidy to needy people.

Figure 4:
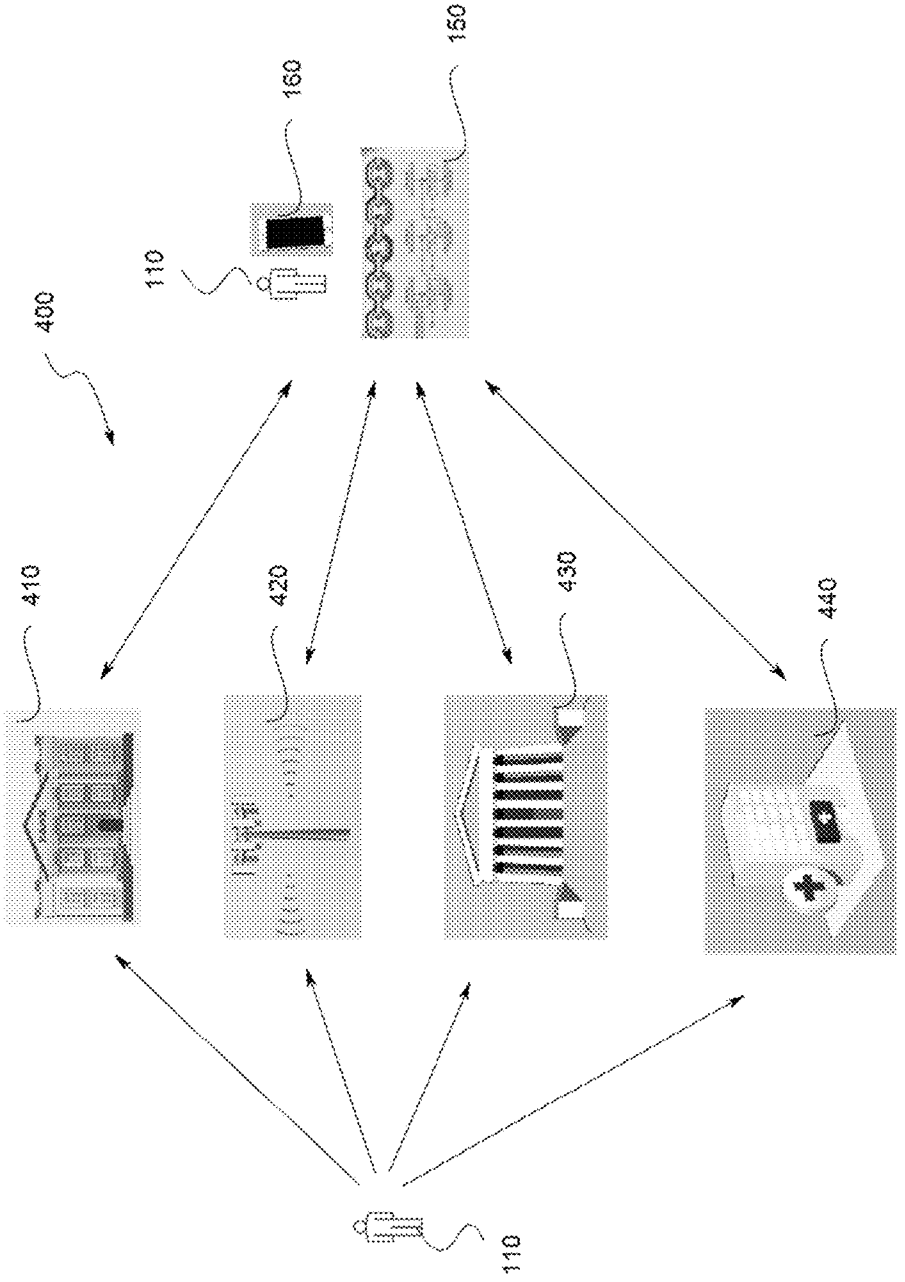
FIG. 4 describes the accessibility of the identity verification platform.

A user when registered to the identity management portal can access the different service providers with or without having electronic mobile device or possessing the physical identity document at the time of access to the different service providers as shown in FIG. 4. A registered user 110 can access the different institutions like banks 410, telecommunication services 420, government 430 and hospital 440 via their electronic mobile devices and the identity of the users saved on an encrypted node database.

Blockchain is the data and record-tracking technology behind cryptocurrency. Blockchain comprises of a chain of blocks, where the blocks are the digital pieces of information associated with individual users, and the chain is the public database of the stored information. The information in the blocks provides transaction data along with information about when, where, and by who the block was added to the decentralized network. The process of blockchain creation comprises of four main steps. First, a transaction happens. Second, the transaction is verified through a network of processors across the globe. Third, the transaction is stored in a block. Fourth, once the transaction is verified, it is given a unique identifying code called a hash. Once the block is hashed, it is added to the blockchain.

A smart contract for a blockchain network is a computerized transaction protocol, which contains a set of rules and terms of agreement in a coded manner between the parties to the smart contract. The smart contract is enforced when the predetermined rules between the parties are met, and it may be executed across a distributed widespread blockchain network. The smart contract code verifies and authenticates the negotiation of an agreement or transaction, and it authorizes transactions and agreements to be carried out without the need of an external enforcement mechanism.

Figure 5:
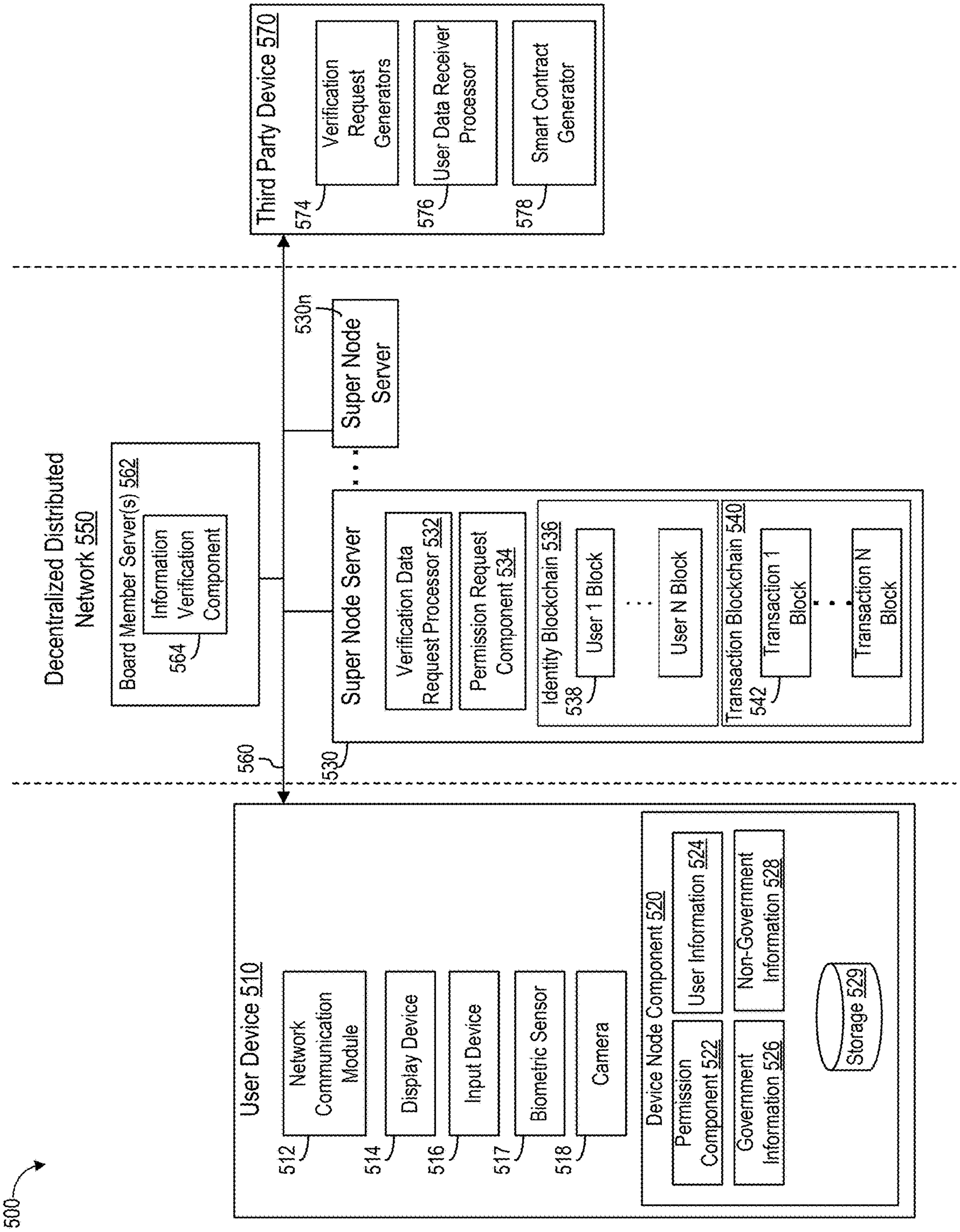
FIG. 5 is a block diagram of a computer-implemented verification system, according to an example embodiment.

FIG. 5 is a schematic diagram of a verification system 500 that is decentralized, according to an exemplary embodiment. The verification system 500 may be used to verify a user's identity, request user relating verification information, transact with one or more entities. The verification system 500 may include, among other systems, a user device 510, a decentralized distributed network 550, and a third-party device 570. The various systems or subsystems of the verification system 500 may communicate through a network 560. The network 560 may be one or more of the Internet, cellular network, Wi-Fi, or any other type of suitable wired or wireless network. In other embodiments, the various systems of the verification system 500 may be remotely located and permit the user to verify their identity.

The user device 510, the decentralized distributed network 550, and the third-party device 570 may each 150 may each include a computer system (e.g., one or more servers each with one or more processing circuits), each including a processor and memory. The processor may be implemented as application specific integrated circuits (ASICs), one or more field programmable gate arrays (FPGAs), a group of processing components, or other suitable electronic processing components. The memory may be one or more devices (e.g., RAM, ROM, Flash memory, hard disk storage, etc.) for storing data and/or computer code for completing and/or facilitating the various verification processes described herein. The memory may be or include non-transient volatile memory, non-volatile memory, non-transitory computer storage media. The memory may further include data base components, object code components, script components, or any other type of information structure for supporting the various activities and information structures described herein. The memory may be configured to communicate with the processor and include computer code or instructions for executing one or more processes described herein.

The user device 510 includes a network communication module 512, a display device 514, an input device 516, a biometric sensor 517, a camera 518, and a device node component 520. The user device 510 may be used by an individual user (e.g., a family member, employee, or a consumer, etc.) to approve or disapprove verification requests and sharing verification data with any third parties. The user device 510 may be a cellular phone, smart phone, mobile handheld wireless e-mail device, personal digital assistance, portable gaming device, laptop computer, desktop computer, touch screen interface tablet, or other suitable device. A user may use the user device 510 to provide approval or rejection to verification data requests from one or more super nodes or from one or more third parties requesting data verification.

The network communication module 512 may include a wireless or wired communication antenna. In some embodiments, the network communication module 512 may be a one or more antennas such as, but not limited to, a Wi-Fi, an LTE, a 4G, a 5G antenna. The network communication module 512 may include, for example, program logic that connects the user device 510 to the network 560. For example, the user device 510 may receive and display screens including verification data sharing approval or rejection screens. In one embodiment, a screen may be used to request permission from the user, to prompt the user to provide approval regarding an amount of a transaction and which merchant or individual (e.g., name, address, phone number or e-mail, a selection of a recipient by the user from his/her memory or from the user device 510, etc.) is to receive the verification data. Such screens are presented to the user via the display device 514.

The display device 514 may be a touch interface screen that receives user input regarding the user's choices. The input device 516 may in some embodiments be a keyboard, mouse, digital pen, or a touch screen that receiving user inputs regarding the data verification permissions.

The biometric sensor 517 may be a retina scanner, a fingerprint scanner that is used to receive user information 524 into the device node component 520 and the user block 538 in the identity blockchain 536.

The camera 518 may include various elements among a lens, a sensor, an aperture, and a shutter. The camera 518 may be configured focuses the lens when a user wants to take images of themselves to provide to the device node components 520. Then light may enter the lens, and the aperture regulates the amount of light that extends to the sensor. Once the amount of light is regulated, the shutter determines how long the sensor is exposed to light. Then the sensor captures the image and the camera 518 hardware processes the image. In some embodiments, the images of the user taken by the camera 518 may be stored in the user information 524. In other embodiments, the images of the user taken by the camera 518 may be stored in the identity blockchain 536 of the super node server 530.

The device node component 520 may be a component that is located on the user device 510. In other implementations, portions of the device node component 520 may be located on a cloud-based server. The device node component 520 may cryptographic encrypt the user information 524, the government information 526, the non-government information 528 and the storage 529. The permissions component 522 can receive from one or more server nodes a permission request to the device nodes component 520, wherein the permission request comprises asking the device nodes component 520 for permission to share the verification data based on the seed information provided by the third-party regarding the user.

The user information 524 may include identification information that comprises at least one of biometric information, name, address, phone number, social media identifier, personal identification number, photographs of the user.

The government information 526 may include at least one of passport, driver license, birth certificate, graduation certificate. The non-government identification information comprises online network information, online retailer information (e.g., Apple®, Amazon®, Facebook®, or Google®.

The decentralized distributed network 550 includes a super node server 530, super node server 530*n* and a board member server(s) 562. In this embodiment the super node servers comprises board member servers 1010 and an identity network 1020. Identity information is sent to the identity network 1020 by individuals 1030. Board member servers 1010 then verify the new identity information. Verified identity information can then be used to verify the identities in individuals. Although only two super nodes are shown in FIG. 5, the decentralized distributed network 550 includes a plurality of super node servers as evidenced by super node server 530 . . . super node server 530*n*. Each of the N super node servers may include, at least a verification data request processor, a permission request component, an identity blockchain, and a transaction blockchain. Similarly, a single board member server(s) 562 is shown in FIG. 5, there may be multiple board member servers that verify the user provided information in the identity blockchain 536. In various embodiments, the super node servers 530 may detect the movements of the user device 510 nodes and seamlessly transfer the identity block and the transaction blocks to another super node servers 530*n*.

The super node server 530 includes a verification data request processor 532, a permission request component 534, an identity blockchain 536, and a transaction blockchain 540. The super node servers 530 may be implemented on a computer system that is capable of communicating with other super node servers, user devices 510, board member server(s) 562 and third-party devices 570. The super node server 530 is responsive to receiving an approval from the one or more device nodes to share at least a portion of the verification data, the one or more super node servers sends at least the portion of the verification data to the third party.

The super node server 530*n* Super nodes are highly connected points in a blockchain network. In general, the super node servers 530 to 530*n* are permanently switched on and constantly run the blockchain software—this makes them a reliable point of contact for other nodes to join or rejoin the network. They also use considerably more processing power than other nodes, as they make connections and transfer information to other network members.

The verification data request processor 532 may receive a request for verifying data from a third-party device 570. The verification data request processor 532 may decrypt the verifying data request from a third-party device 570. After decrypting the verifying data request the super node server 530 may search the identity block chain 536 for the appropriate user block. After the user block has been identified, the super node server 530 may use the permission request component 534 to send a permission request to the user device 510 and request that the user device send a permission to share the verifying data according to the verifying data request from the third-party device 570. In some embodiments, the user device 510 may receive user input such that only a portion of the verifying data request is approved to be shared with the third-party device 570 because the verifying data request may have been too broad.

The identity blockchain 536 may include multiple user blocks with user information 524, government information 526 and non-government information 528 regarding each and every user in the block chain. The identity blockchain 536 is shown has having a user block 538 and a plurality of blocks user N block. Each block contains identity verification data of a user and may be used to verify the identity of the user.

The transaction blockchain 540 include multiple transaction blocks such as transaction 1 block 542. The transaction 1 block 542 includes information regarding the transaction and that has occurred via the smart contract mechanism of a third party.

The board member server(s) 562 may be implemented on one or more computer systems that are in communication with each other. The board member server(s) 562 includes information verification component 564. In various embodiments, the super node server 530 may receive new governmental issued credential information. In some embodiments the board member server(s) 562 may be owned by the government agency that issued credential information. Since a government agency is considered a trusted party in the decentralized distributed network 550, the government agency is eligible to be a board member. In some embodiments, when the super node server 530 receives new government credentials for a user block 538, the verification data request processor 532 may query the information verification component 564 of the board member server(s) 562 two verify the new government credentials. Upon verifying the new government credentials, the user block 538 is updated accordingly.

The third-party device 570 includes a verification request generator 574, a user data receiver processor 576, and a smart contract generator 578. The verification request generator 574 may be implemented on a computer system and based on input from a third party. The verification request generator 574 may generate a data verification request that comprises requesting the data related to a user from super node servers 530 to 530*n*. Upon receiving the written data verification request from the verification request generator 574, the super node server 530 may search the identity block chain 536 to identify a user block. Next, the super node server 530 may send a permission request to the user device 510. The permission request may comprise requesting the user to approve or deny access to particular data. For example, the permission request may be based on a data verification request such that if the data that needed to be verified was a driver's license then the permission request would request that the user indicate via an input device 516 to share the requested driver's license information. In some embodiments, the user may be offered the option to only share partial driver's license information. Partial driver's license information may not include the user's birth date including the year. In some embodiments the partial driver's license information may include the license number and expiration date of the license. Accordingly, the verification system 500 allows a user the option to choose to share portions of data for some transactions and choose not to share other portions of data for other transactions.

The user data receiver processor 576 may be used when the super node server 530 provides the user data or user data verification to the verification request generator 574. The user data receiver processor 576 may verify that it received the requested data and thereby determine the identity of the user. Upon verifying the identity of the user the user data receiver processor 576 may inform the smart contract generator 578 that a transaction with the user and the third party has been verified and can occur.

The smart contract generator 578 may have additional verification requirements in order to initiate a transaction between the third-party device 570 and the user device 510. Accordingly, after the smart contract generator 578 has verified that the preconditions for a transaction have been met the smart contract generator 578 may transmit transaction details to the super node server 530. The super node server 530 may update the transaction block chain 540 by adding a transaction block to the transaction block chain 540. The transaction block chain 540 may include the identity of at one or more users that were involved in the transaction, the amount of the transaction, and the smart contract details. Various different types of transactions may be facilitated using the verification system 500. The type of transactions may include cash transfer (deliver voucher w/or without conditions), bank accounts (enable individuals to set up bank accounts), remittance (deliver money securely, cheaply anywhere w/verification), healthcare transactions (manage record, validate vaccines and maternal care), refugees transactions (provide global digital identify with a wallet and ability to received funds). Other transactions may include, family reunification (track loved ones and reunify if the individual is separated), food (disperse food efficiently and consistently using biometric identity), age verification (to prevent early marriages, authorization to enter a marriage). Other transactions may include gender targeting (send money to women and ensure they the intended recipient spends the funds), land transactions (ensure title and deeds are attached to individuals) and political and legal rights related transactions (voting, petition filings and inheritance). Each of the above-mentioned transaction may utilize verification system 500 to empower individuals and economies.

Figure 6:
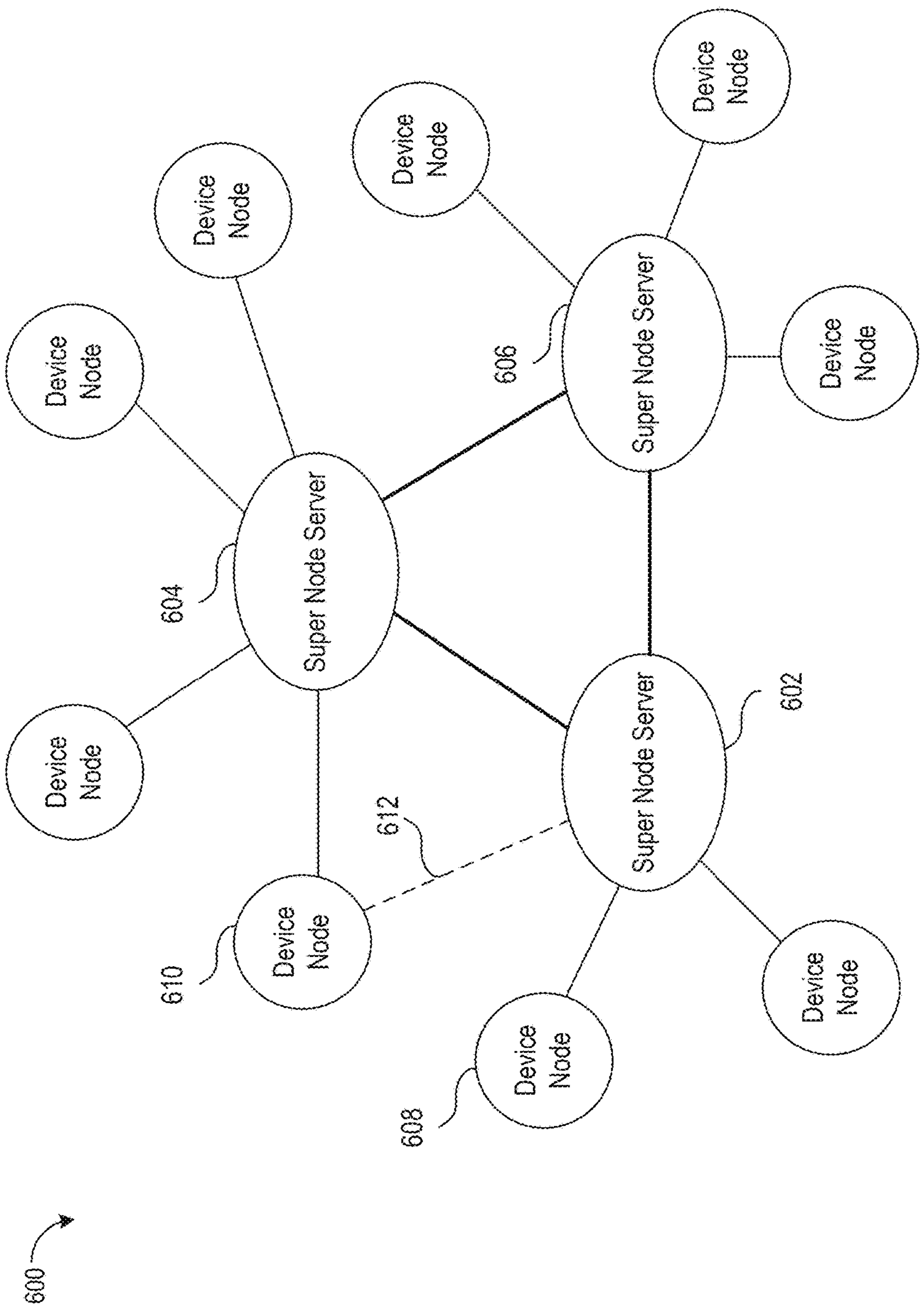
FIG. 6 illustrates a node diagram that distinguishes the super node servers from the device nodes, according to an example embodiment.

Referring to FIG. 6, FIG. 6 is a schematic 600 of a distributed system of super node servers 602 with connections to device nodes 608. Each super node server (602, 604, 606) is connected to other super node servers. Every update to the blockchain in a super node server (602, 604, 606) to propagated to every other super node server (602, 604, 606) in the distributed system.

The device nodes 608 are each connected to one or more super node server (602, 604, 606). The device nodes 608 can update identity information to super node servers (602,604, 606) and send smart contracts 702 to super node servers (602,604, 606) that can be executed if conditions are satisfied. Each time a device node 608 updates identity, the super node server 602 propagates the update to the other super node servers (604, 606) in the distributed system. Likewise, each time the conditions for a smart contract 702 are satisfied, the super node server 602 propagates the completed smart contract 702 to the other super node servers (604, 606) in the distributed system. A device node 610 can form a connection 612 to more than one super node server (602, 604).

Referring to FIG. 7, FIG. 7 is a diagram 700 of a transaction 716 between two parties that is completed by a smart contract 702. The diagram 700 includes a smart contract 702, a transaction blockchain 706, and an identity blockchain 708. The present disclosure is not limited to transactions 716 between two parties, as shown in FIG. 7. Some embodiments of the present disclosure have as few as one party and some embodiments have more than 2 parties.

The transaction blockchain 706 comprises a chain of individual transaction blocks 710. There is a transaction block 710 for each transaction 716. Every time a transaction

716 takes place, a transaction block 710 is appended to the end of the transaction blockchain 706.

The identity blockchain 708 comprises a chain of identity block 712 or identity block 714. Each identity block contains one or more pieces of identity information for an individual and a unique identifier such as a number for an individual. Identity information might be a government ID number, medical record such as a vaccination, or personal biometric data such as a fingerprint.

The smart contract 702 comprises one or more identity conditions and one or more transaction instructions. An identity condition of a smart contract 702 is a piece of identifying information in an identity block 712. The smart contract 702 transaction instructions are executed when all identity conditions are met. An example of a simple transaction instruction is an instruction that when executed, causes a display to print an affirmative message saying that the conditions of the smart contract 702 have been met.

The transaction 716 shown in FIG. 7 is a set of transaction instructions in a smart contract that are executed when the identity conditions in two identity blocks (712 and 714) are met. The transaction 716 may be any set of instructions that can be executed by a computer device. In one embodiment, the transaction 716 is an exchange of currency. In another embodiment, the transaction is opening an automatic gate.

Figure 8A:
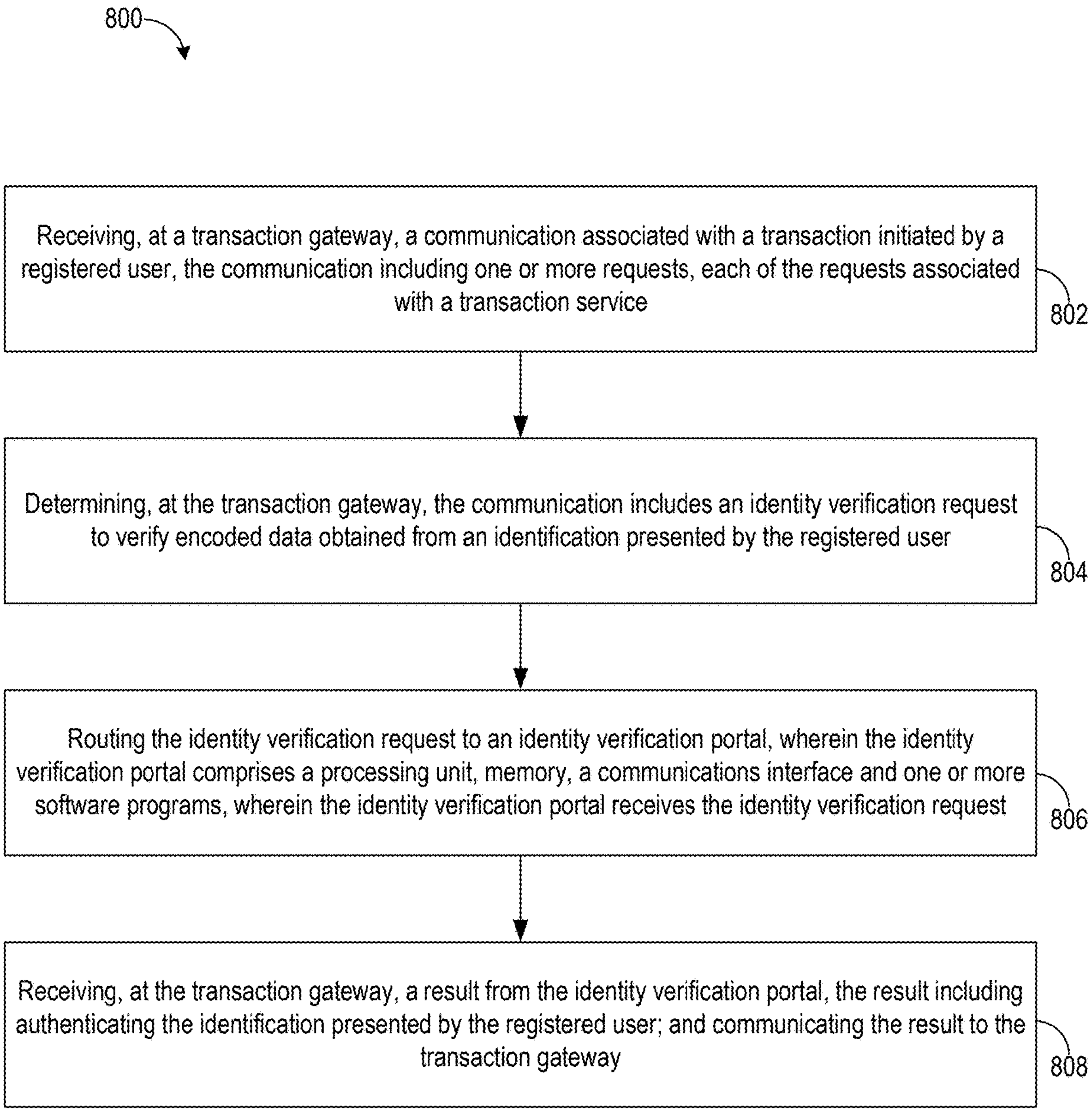
FIG. 8A illustrates a verification process that may be implemented by the system in FIG. 5 according to an example embodiment.

Referring to FIG. 8A, FIG. 8A is a flow chart that illustrates a process 800 that may be performed by the system illustrated in FIG. 5. Step 802 includes receiving, at a transaction gateway, a communication associated with a transaction initiated by a registered user, the communication including one or more requests, each of the requests associated with a transaction service. Step 804 includes determining, at the transaction gateway, the communication includes an identity verification request to verify encoded data obtained from an identification presented by the registered user. Step 806 routes the identity verification request to an identity verification portal, wherein the identity verification portal comprises a processing unit, memory, a communications interface and one or more software programs, wherein the identity verification portal receives the identity verification request. Step 808 is receiving at the transaction gateway, a result from the identity verification portal, the results including authenticating the identification presented by the registered user; and communicating the result to the transaction.

Figure 8B:
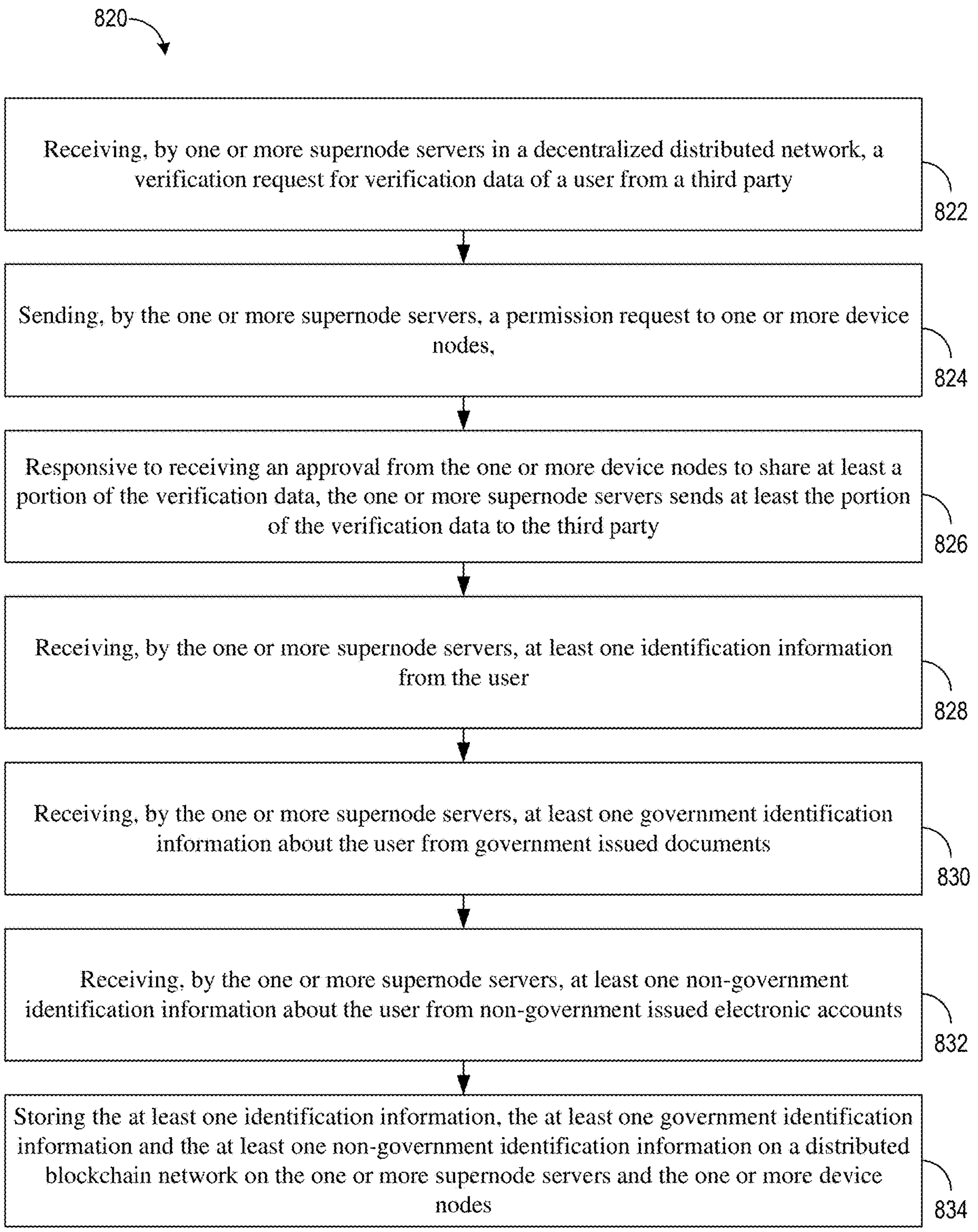
FIG. 8B illustrates a verification process that may be implemented by the system in FIG. 5 according to an example embodiment.

Referring to FIG. 8B, FIG. 8B is a flow chart that illustrates a process 820 that may also be performed by the system illustrated in FIG. 5. Step 822 is receiving, by one or more super node servers in a decentralized distributed network, a verification request for verification data of a user from a third party. Step 824 is sending, by the one or more super node servers, a permission request to one or more device nodes. Step 826 is responsive to receiving an approval from the one or more device nodes to share at least a portion of the verification data, the one or more super node servers sends at least the portion of the verification data to the third party. Step 828 is receiving, by the one or more super node servers, at least one identification information from the user. Step 830 is receiving, by one or more super node servers, at least one government identification information about the user from government issued documents. Step 832 is receiving, by the one or more super node servers, at least one non-government identification information about the user from non-government issued electronic accounts. Step 834 is storing the at least one identification information, the at least one government identification information and the at least one non-government identification information on a distributed blockchain network on the one or more super node servers and the one or more device nodes.

Figure 8C:
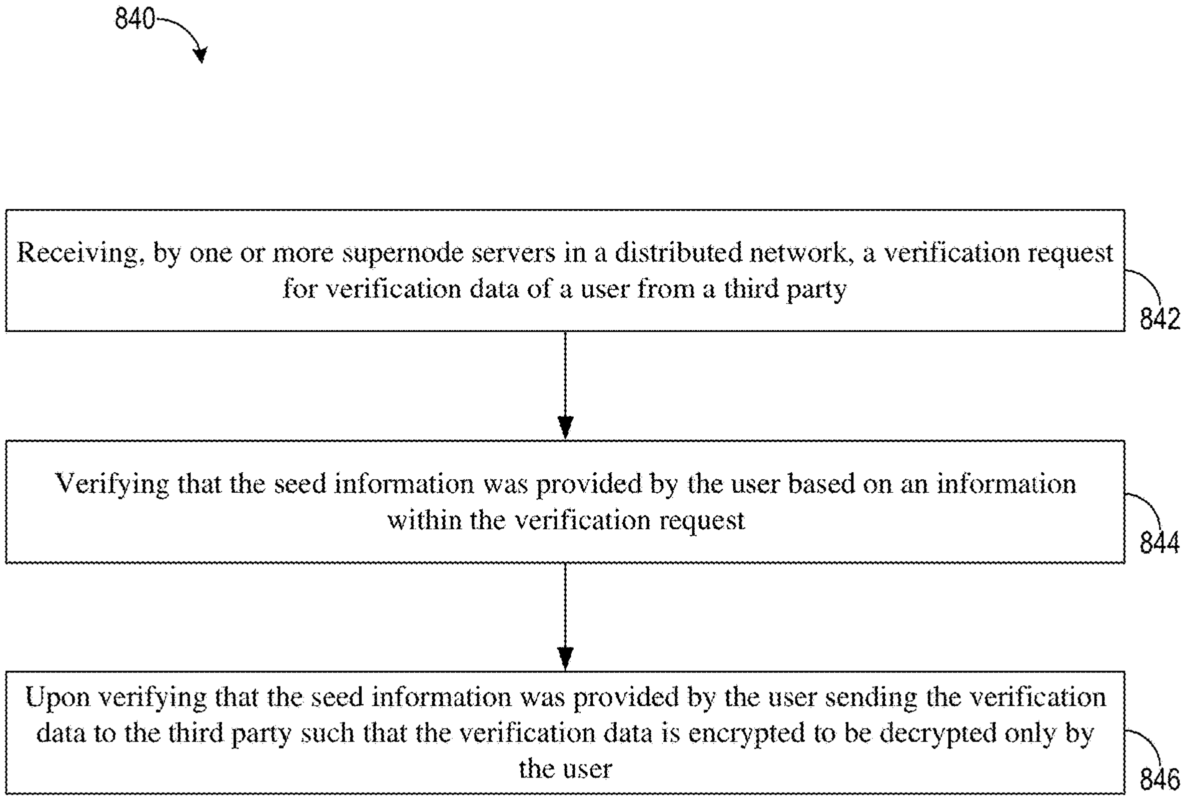
FIG. 8C illustrates a verification process that may be implemented by the system in FIG. 5 according to an example embodiment.

Referring to FIG. 8C, FIG. 8C is a flow chart that illustrates a process 840 that may also be performed by the system illustrated in FIG. 5. Step 842 is receiving, by one or more super node servers in a distributed network, a verification request for verification data of a user from a third party. Step 844 is verifying that the seed information was provided by the user based on an information within the verification request. Step 846 is upon verifying that the seed information was provided by the user, sending the verification data to the third party such that the verification data is encrypted to be decrypted on by the user.

Figure 9:
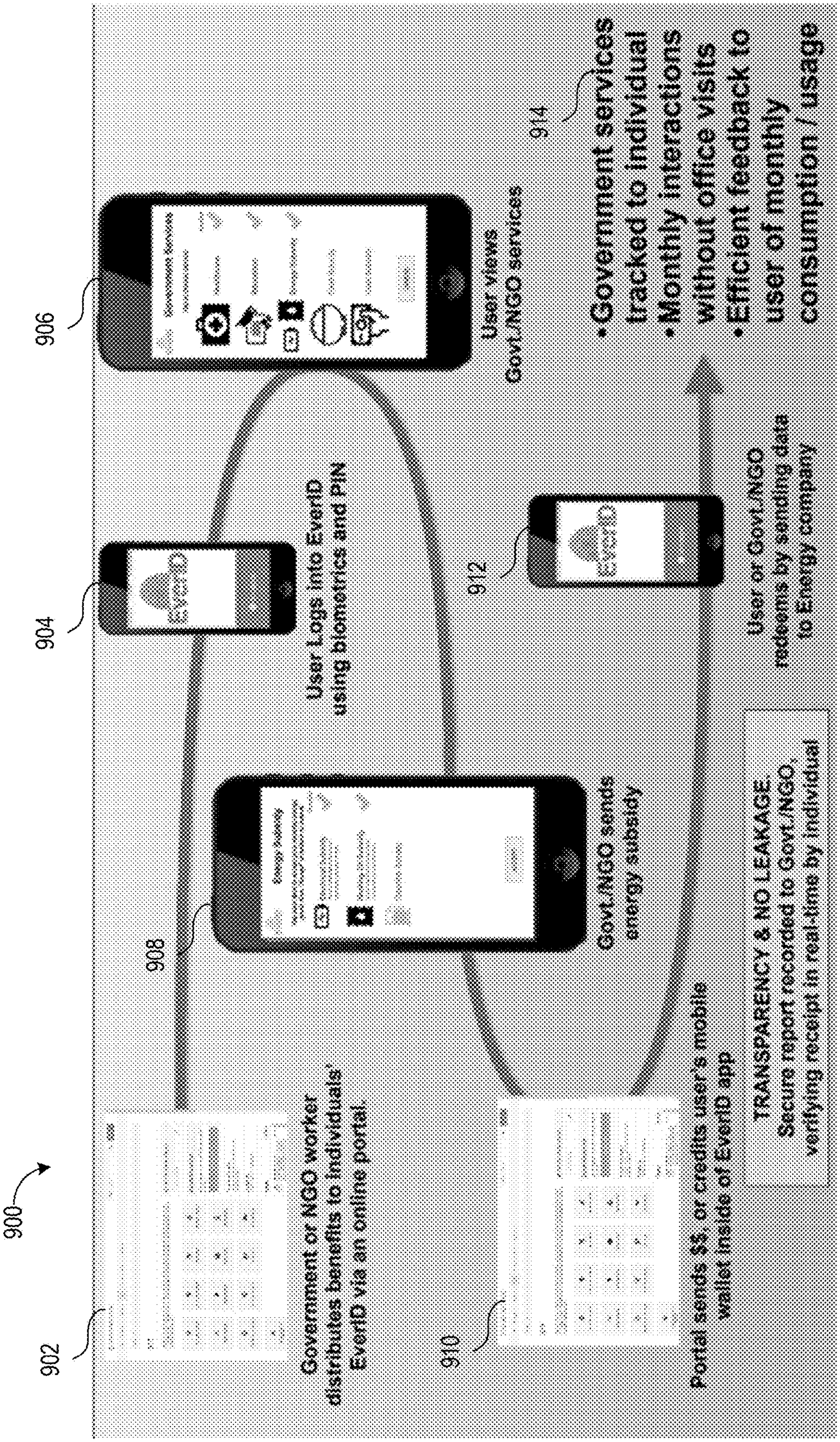
FIG. 9 illustrates a flow chart for transparency and leakage prevention that may be implemented by the system in FIG. 5 according to an example embodiment.

Referring to FIG. 9, FIG. 9 is a flow chart that illustrates a process 900 which describes a transparency and no leakage secure report recorded to government or non-governmental organization (Govt./NOG), verifying receipt in real-time by individual. At step 902, the Govt./NGO worker distributes benefits to individuals via an online portal. At step 904, the user logs into the mobile device using biometric and PIN. At step 906, the user views the Govt./NOG services that are displayed on the mobile device. At step 908, the Govt./NOG sends energy subsidy. At step 910, the portal sends a dollar amount or credits user's mobile wallet inside the mobile device. At step 912, user or Govt./NGO redeems by sending data to the energy company. In step 914, government services are tracked to individuals, monthly interactions without office visits are provided, and efficient feedback is provided to user of monthly consumption and usage.

Figure 10:
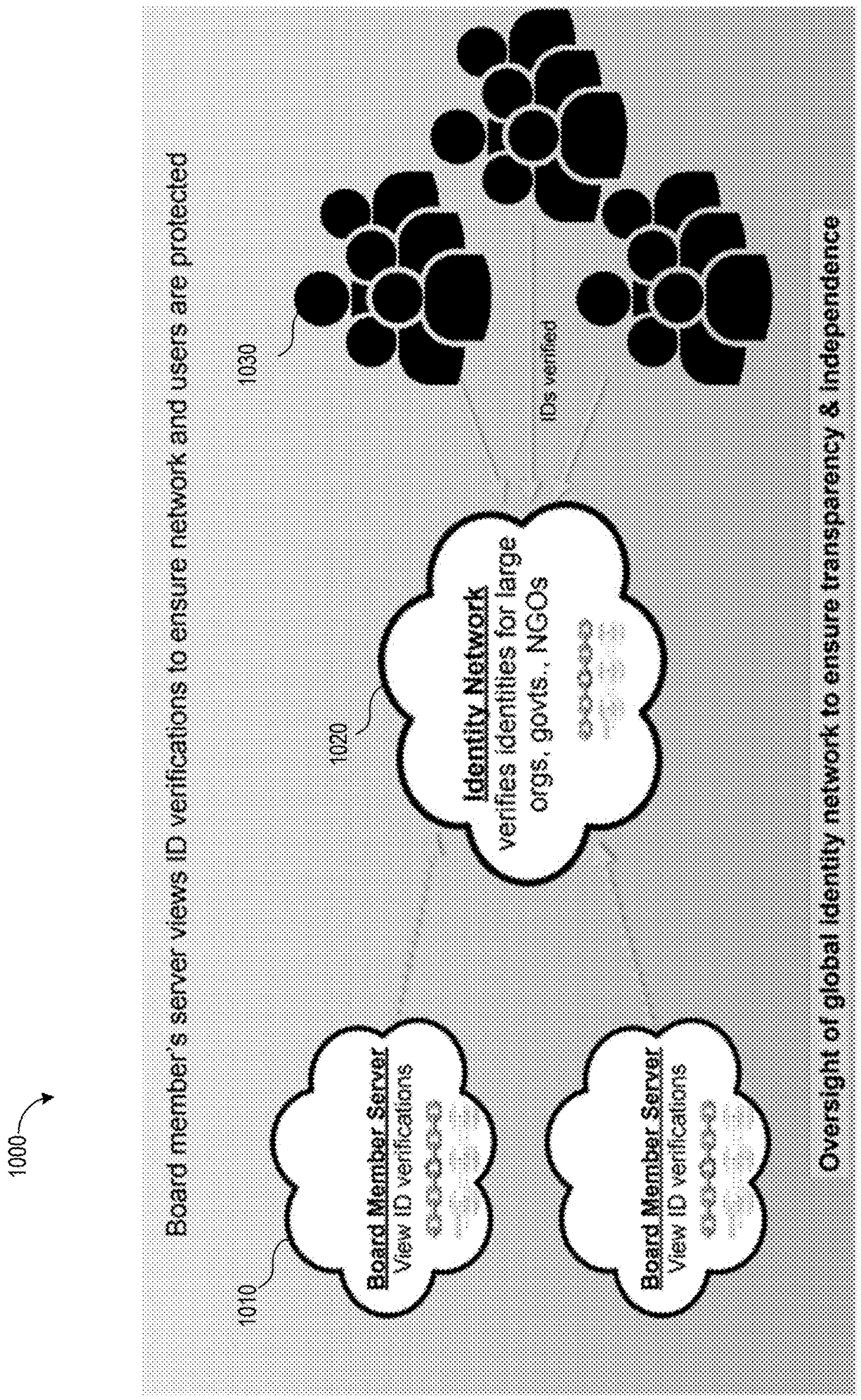
FIG. 10 is a global identity network to ensure transparency and independence that may be implemented by the system in FIG. 5 according to an example embodiment.

Referring to FIG. 10, FIG. 10 is a schematic 1000 of embodiments of the super node server verification system. In this embodiment the super node servers comprises board member servers 1010 and an identity network 1020. Identity information is sent to the identity network 1020 by individuals 1030. Board member servers 1010 then verify the new identity information because the board member servers 1010 issued the original credentials to the user. In other embodiments, the board member servers 1010 may contract out the job of verifying the originally issued credentials. In one example, the board member servers 1010 may be owned by a state authority that issues drivers' licenses such as the Department of Motor Vehicles. Accordingly, the board member server(s) 562 may receive a verification request from one or more super node servers when a new drivers' license is provided to the user block 538. The information verification component 564 of the board member server(s) 562 performed the verification function. Verified identity information can then be used to verify the identities of individuals.

Figure 11:
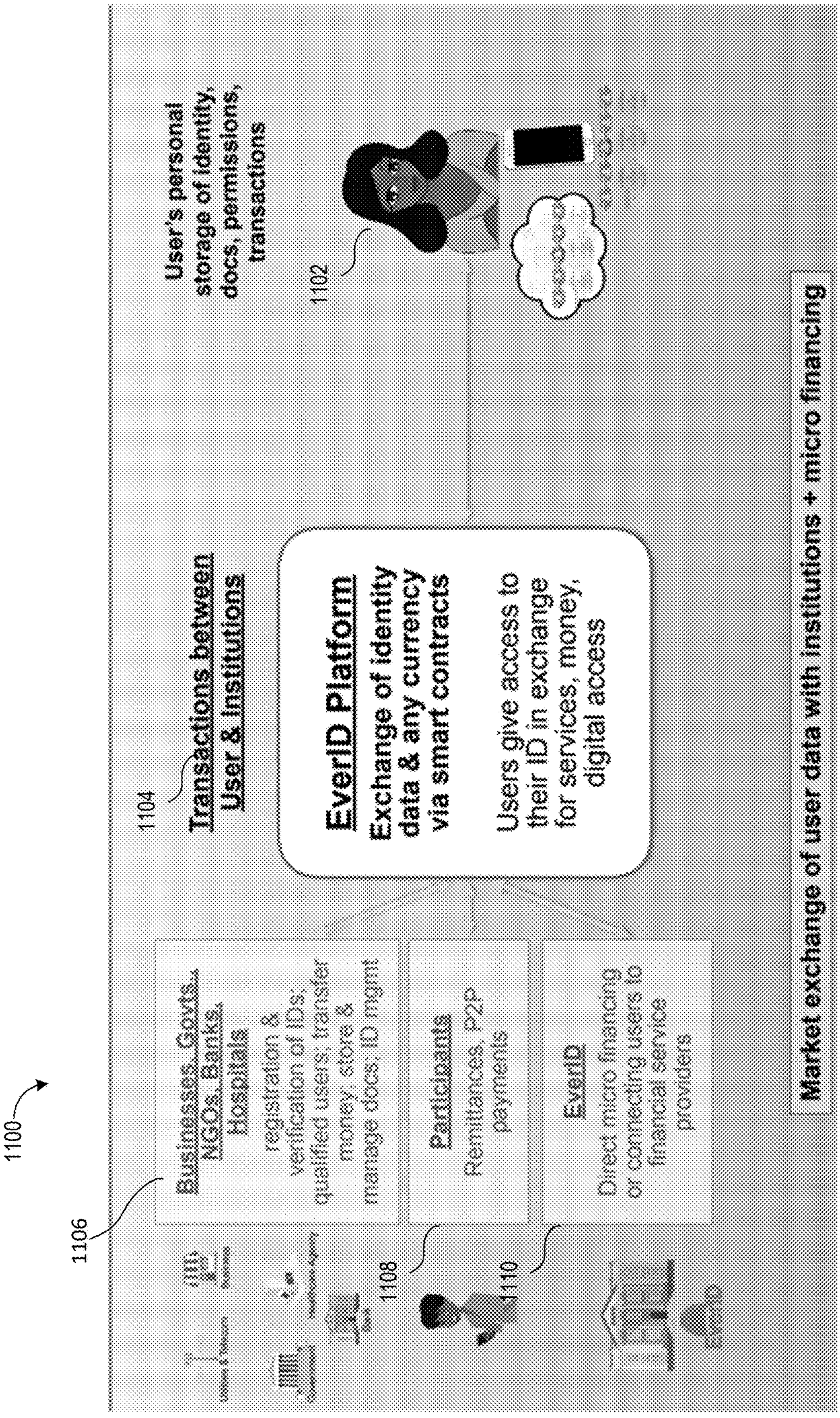
FIG. 11 is a network of market exchange of user data with institutions that may be implemented by the system in FIG. 5 according to an example embodiment.

Referring to FIG. 11, FIG. 11 is a flow chart that illustrates a process 1100 that may be implemented by the system in FIG. 5. The process 1100 is a process for market exchange of user data with institutions plus micro financing. In step 1102, the user inputs stores on to the device their personal identity, documents, permissions, and transactions. Step 1104 is the transaction between the user and institutions, where the user gives access to their identification in exchange for services, money, or digital access. Step 1106 is the businesses, governments, non-government organizations, banks, or hospitals. In step 1106, the identification is registered and verified, users are qualified, money is transferred, documents are managed and stored, or identification is managed. At step 1108, remittances or person-to-person transaction payments are made by participants. Step 1110 is the platform, where the users are connected to financial service providers or direct micro financing is provided.

Figure 12:
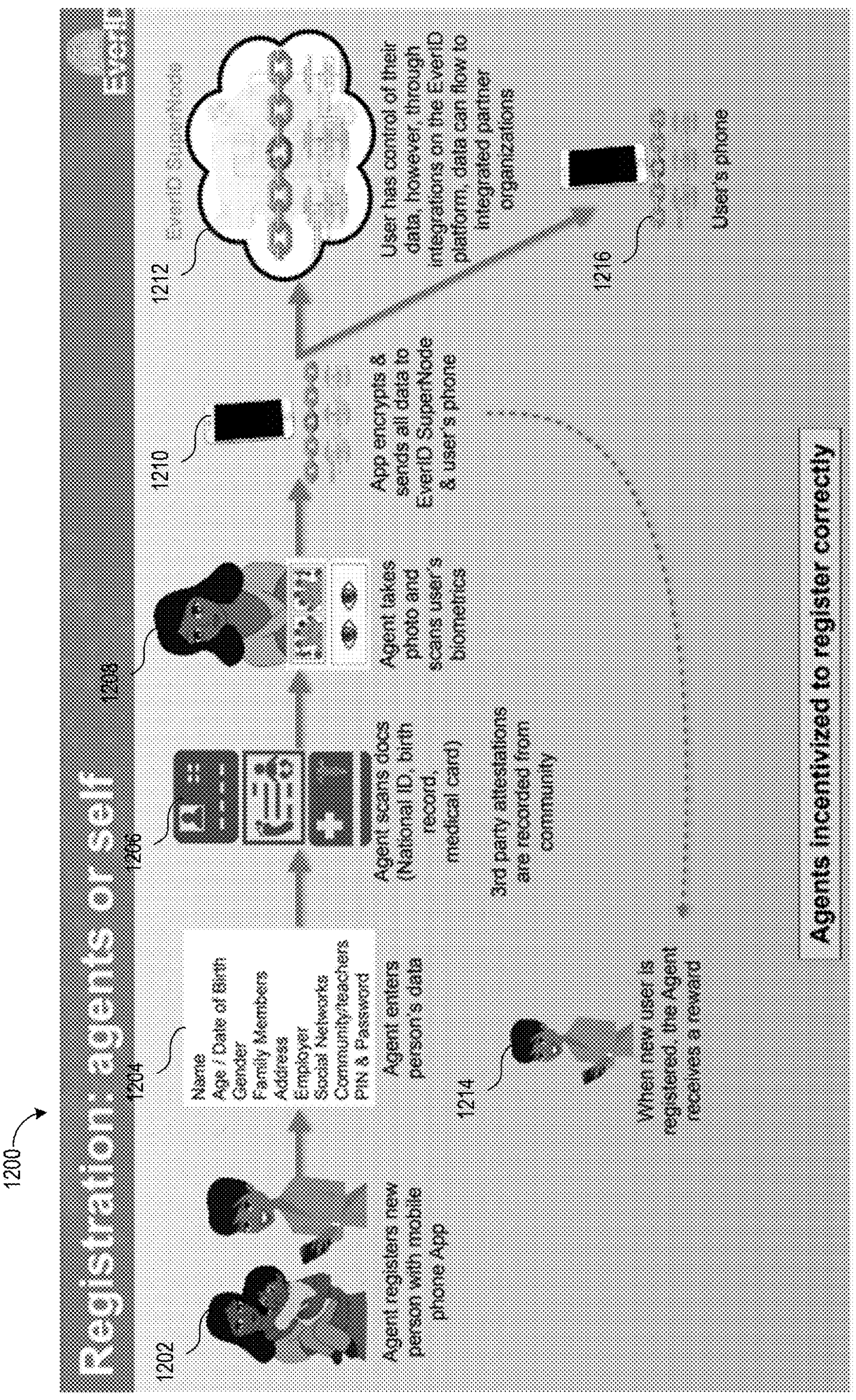
FIG. 12 illustrates a flowchart for incentivized agents registering users correctly that may be implemented by the system in FIG. 5 according to an example embodiment.

Referring to FIG. 12, FIG. 12 illustrates a flow chart 1200 that incentivizes agents to register users correctly. At step 1202, the agent registers a new user with a user device 510. At step 1204, the agent enters the user's data. The data can any of the following but not limited to name, age, date of birth, gender, family members, address, employer, social networks, community, teachers, PIN, or passwords. At step 1206, the agent scans the user's documents such as national ID, birth record, or medical record. At step 1206, alternatively, the third-party attestations are recorded from community to further verify the uploaded documents. At step 1208, the agent takes a photo of the user using a camera, and scans the user's fingerprints using a biometric device. At step 1210, the decentralized distribute network 550 encrypts the data and sends all the data to the super node server 530 and the identity blockchain 536. Upon updated the identity blockchain 536, the decentralized distributed network 550 also sends all to the user device 510. At step 1212, the user gets access and control of their personal data. However, through integrations on the super node server 530, data can flow to integrated partner organizations. At step 1214, the agent is rewarded upon registering and verifying the new user on to the identity blockchain 536 of the board member server(s) 562. At step 1216, the data is sent to the user's device 510.

Figure 13:
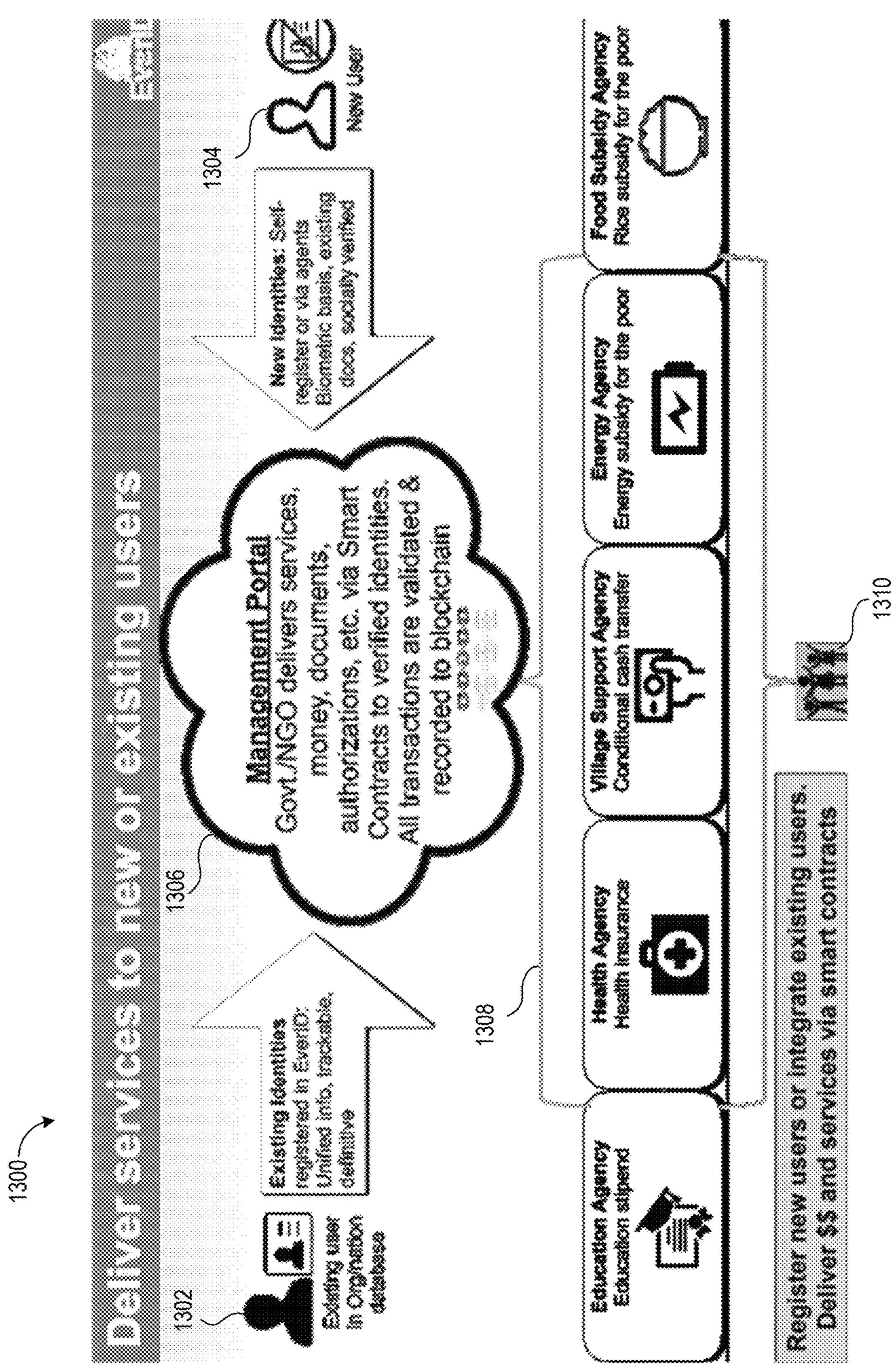
FIG. 13 is a registration network of new identities and already existing identities that may be implemented by the system in FIG. 5 according to an example embodiment.

Referring to FIG. 13, FIG. 13 illustrates a flow chart 1300 that registers new users or integrates existing users. Upon registering new users or integrating new users, the flow chart 1300 delivers an amount of money or services via smart contracts that are generated by the smart contract generator 578 within the third-party device 570. At step 1302, existing identities in organization database are registered on to the identity blockchain 536 of the decentralized distributed network 550. The registration through the step 1302 may further be traceable and definitive. At step 1304, new identities are self-registered or registered through third-party device 570 via agent's biometric basis. Step 1304 may alternatively register the new identities through the usage of existing documents or social verification. Upon the registration of new identities or already existing identities, the management portal 1306 which is a decentralized distributed network 550 can verify the identities through smart contracts that are generated by the smart contract generator 578. Upon verification of the identities, the transactions are validated and further added upon the identity blockchain 536 of the board member server(s) 562. Step 1308 is all the service providers. At step 1308, the service provides may be any of the following but not limited to education agency providing education stipend, health agency providing health insurance, village support agency providing conditional cash transfer, energy agency providing energy subsidy for the poor, or food subsidy agency providing rice subsidy for the poor. Step 1310 is the identities that were registered and verified through the decentralized distributed network 550 and now can benefit from the services that are provided by all the service providers.

Figure 14:
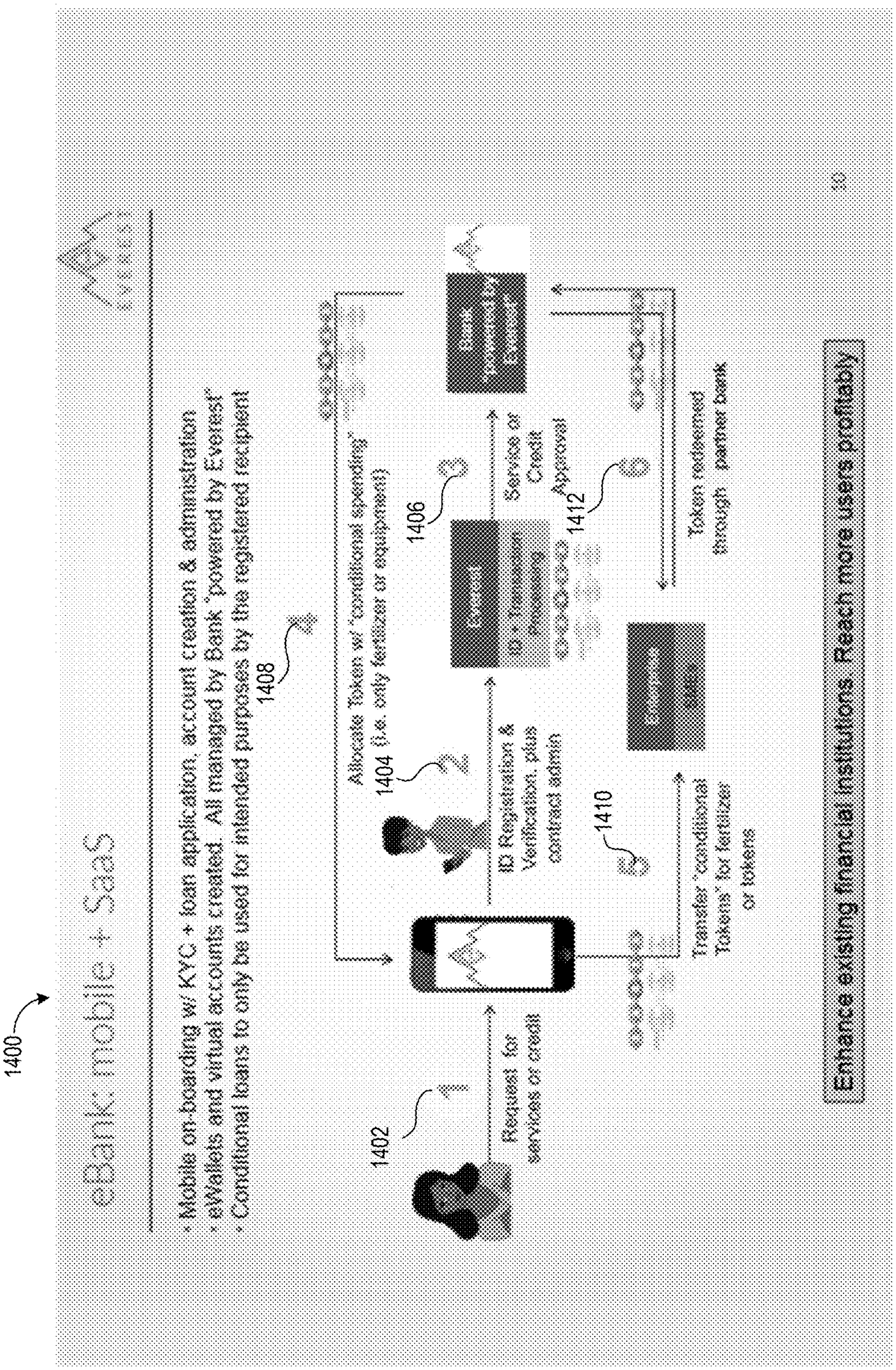
FIG. 14 illustrates a flowchart to enhance existing financial institutions that may be implemented by the system in FIG. 5 according to an example embodiment.

Referring to FIG. 14, FIG. 14 illustrates a flow chart 1400 that enhances existing financial institutions, which leads to reaching more users profitably. At step 1402, through a user device 510, a user requests for services or credit. The request is encrypted in the device node component 520 and sent to the decentralized distributed network 550. At step 1404, upon receiving the request, the board member serve(s) 562 verify the identity by checking the identity blockchain 536 of the super node server 530. At step 1406, upon verifying a user, the decentralized distributed network 550 sends credit approval to a bank that may be bank, which may be a third-party device 570. At step 1408, upon receiving the request, the bank allocates tokens with conditional spending (e.g. only fertilizer or equipment), and the allocated tokens are sent to the user device 510. At step 1410, upon receiving the allocated tokens, the user may transfer the conditional tokens to an enterprise that may be another third-party device 570. At step 1412, upon receiving the conditional tokens from the user, the recipient third party sends a smart contract to the decentralized distributed network 550 through the usage of the smart contract generator 578. The board member server(s) 562 of the decentralized distributed network is able to verify the user and the tokens by a search through its identity blockchain 536 within the super node server 530. Step 1412 further illustrates that upon verifying the user and the tokens, the token recipient third party is able to redeem the conditional tokens from the bank where the conditional tokens were initiated.

Figure 15:
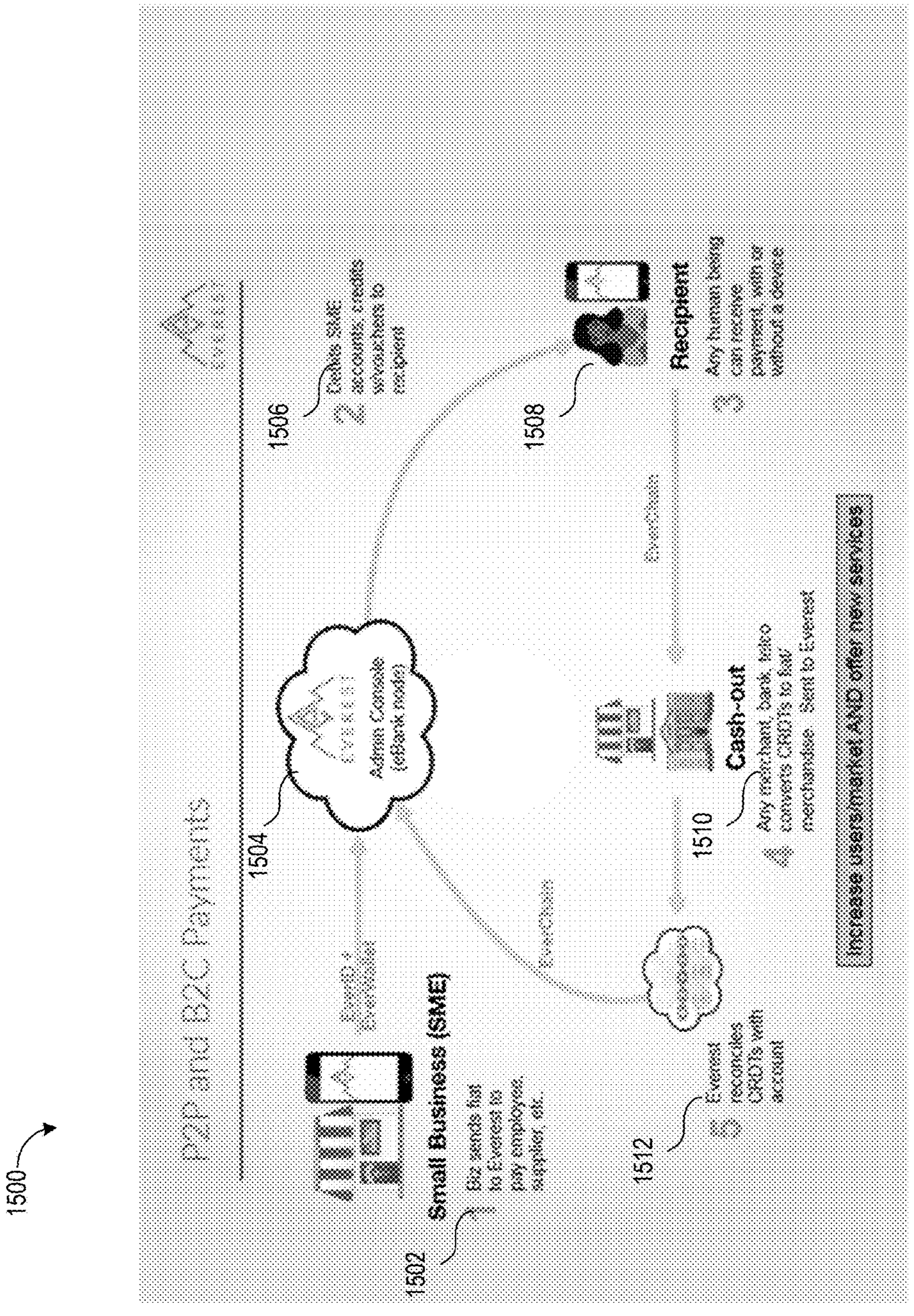
FIG. 15 illustrates a flowchart for new services being offered from the market to new users that may be implemented by the system in FIG. 5 according to an example embodiment.

Referring to FIG. 15, FIG. 15 is a flow diagram 1500 of a business entity paying money to an individual through the distributed identity registration and verification method and system. At step 1502, a business sends an instruction to debit its account to pay an employee. Other types of transactions are possible such as paying a supplier or another business. At step 1504, an instruction is sent to a super node server to pay money to the individual's account. At step 1506, the individual's account information is updated to reflect the amount of money paid to the individual. At step 1508, the individual can now use that money by completing a smart contract at any participating vendor, business entity, or government agency by submitting identity information to complete smart contracts. An example of identity information to complete a smart contract is providing biometric data such as a fingerprint or eye scan. At step 1510, smart contract is completed and instructions are sent to pay the individual's account funds to a merchant, bank, or other participating entity. At step 1512, the account and identity information for all entities and individuals involved in the smart contract are updated.

FIG. 15 illustrates a fund transfer from person-to-person. In any fund transfer there may be a sender and a receiver. The sender may have a user device 510 that includes a device node component 520. The receiver may be a third-party device 570 controlled by a third party. The third-party device 570 that includes a smart contract generator 578. In various embodiments, a fund transfer may be initiated by third-party device 570 that generates a verification data request using the verification request generator 574. The verification data request may include the amount and the seed information (e.g., phone number, email, social media identifier, driver license, social security, passport number, etc.) for the sender. The verification data request may be transmitted from the third-party device 570 to a super node server 530. The super node server 530 includes a verification data request processor 532 that may decrypt the verification data request. Next, the super node server 530 may search the identity blockchain 536 to determine which one of the user blocks 538 belongs to the sender. Upon determine a matching user block, the super node server 530 generates a permission request using the permission request component 534. The super node server 530 sends the permission request to the user device 510. Upon receiving the permission request from the super node server 530, the device node component 520 decrypts the permission request using the permission component and generates a permission display for the display device 514. The permission display may include a list of choosable data to share with the third-party device 570. Upon receiving the user selection, the device node component 520 may send a message to the super node server 530 to share the user approved verification data. The super node server 530 extracts the user approved verification data from the user block for the user device 510 and send the verification data to the third-party device 570. The smart contract generator 578 may generate a smart contract using the verification data and instruct the super node server 530 to create a new transaction block that includes the transaction details. The transaction details may include the user device 510 seed information, the third-party information, the amount of the transaction. After the creation of the new transaction block the funds are transferred from the sender to the receiver.

Figure 16:
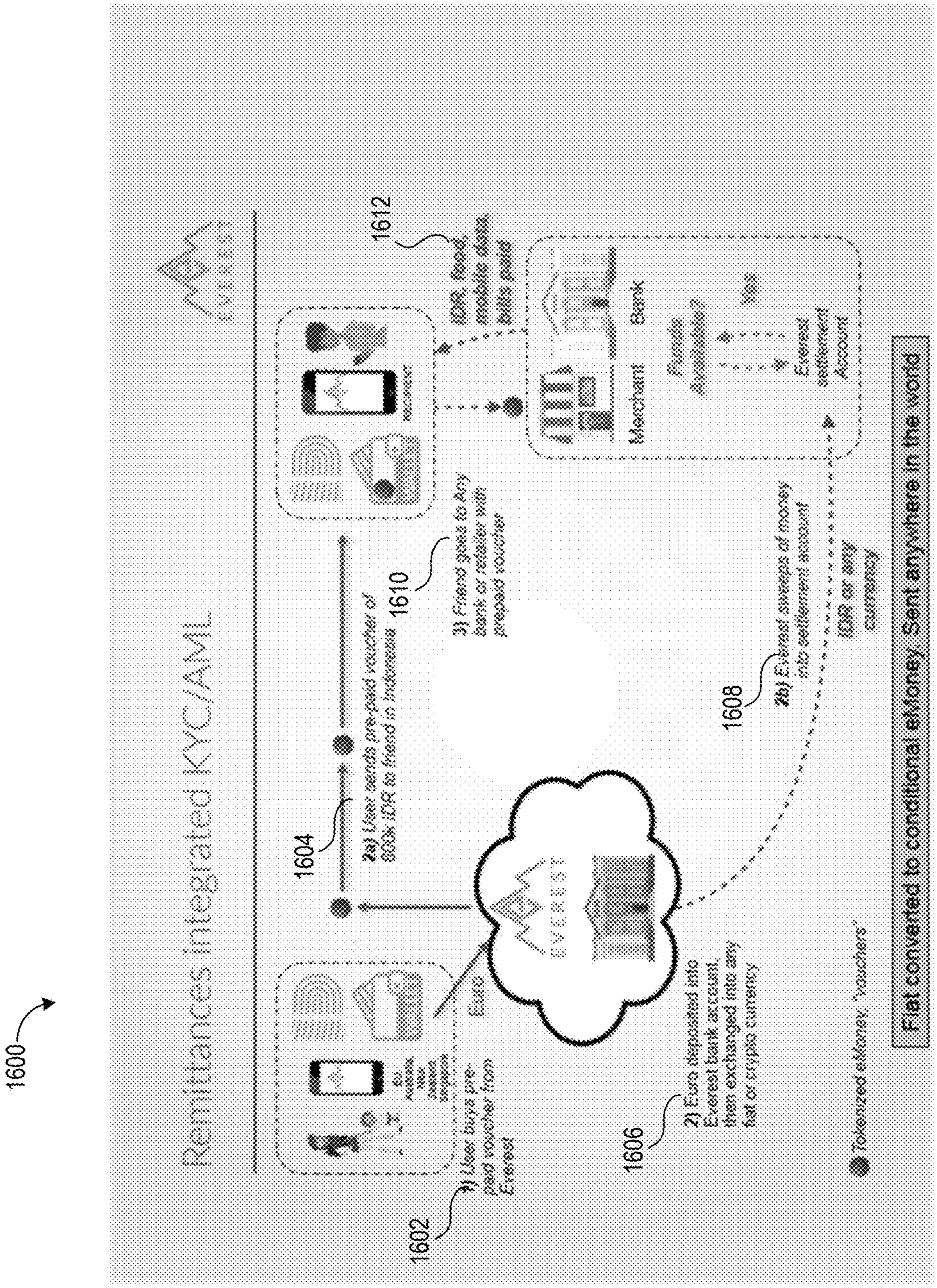
FIG. 16 illustrates a flowchart of converted transactions being sent to different parts of the world that may be implemented by the system in FIG. 5 according to an example embodiment.

Referring to FIG. 16, FIG. 16 is a flow diagram 1600 of a method for sending money from an individual to another individual through the distributed identity registration and verification method and system. At step 1602, an individual purchases a prepaid voucher from an account management entity. Other implementations of this step are possible. The steps in FIG. 16 are not intended to limit any processes of the disclosed subject matter. At step 1604, the individual executes an instruction to send the prepaid voucher to a friend. At step 1606 the money that was originally paid for the voucher is turned into digital currency by the account management entity. At step 1608, the digital currency is placed into a settlement account by the account management entity. The settlement account is tied to smart contracts that execute an instruction to pay the digital currency if identity conditions are met. At step 1610, the friend satisfies the identity conditions to complete the smart contract. At step 1612, the smart contract is executed to cash the voucher and transfer the digital currency to a participating entity such as a bank or retailer.

Figure 17:
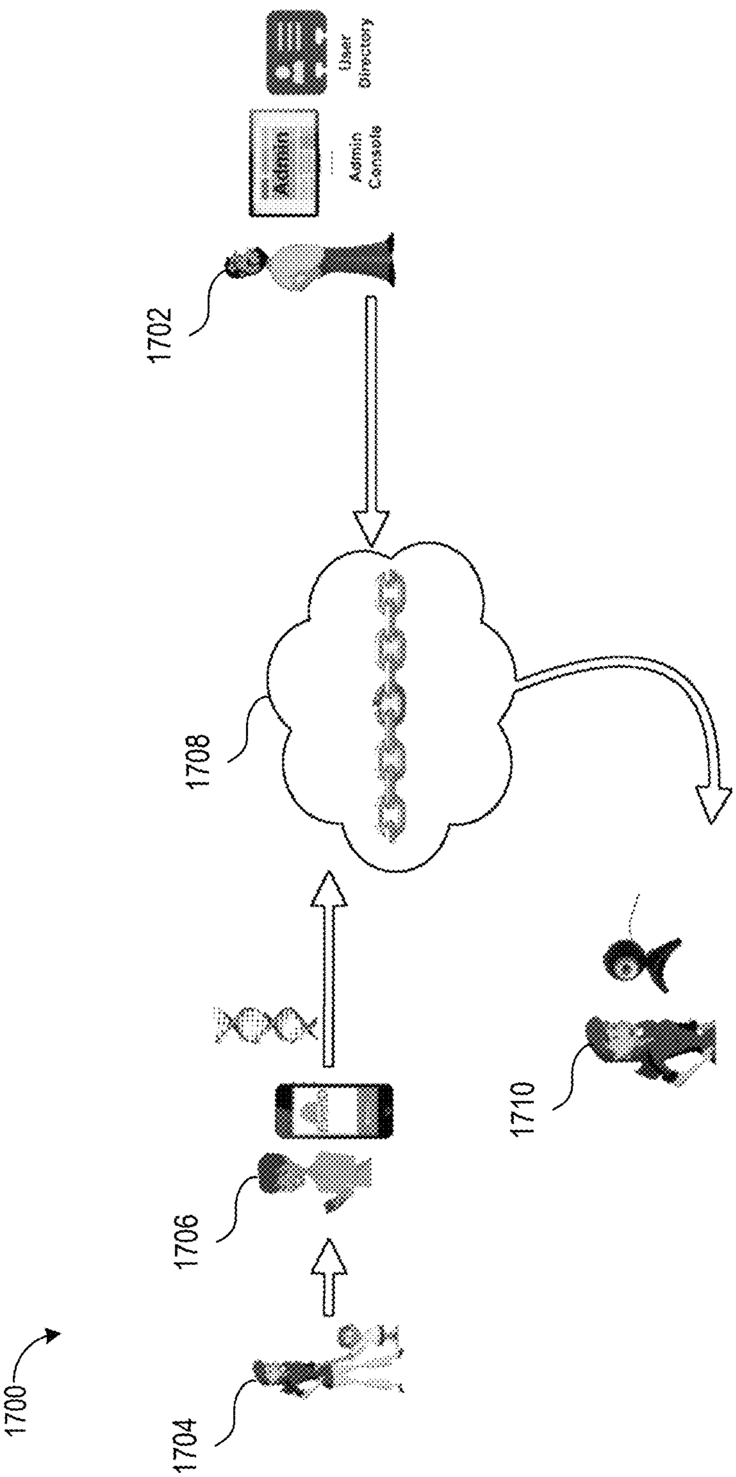
FIG. 17 illustrates a flowchart of a person-to-person transaction that may be implemented by the system in FIG. 5 according to an example embodiment.

Referring to FIG. 17, FIG. 17 is a flow diagram 1700 of a smart contract used to distribute money to people in need of assistance. At step 1702, a smart contract is initiated. Money is placed into an account with the instructions that the money can be distributed to individuals that have been identified as needing assistance. At step 1704, a woman and child seek assistance. At step 1706, an agent identifies the woman as needing assistance and updates her identity to the blockchain. At step 1708, some money from step 1702 is transferred into the account identity information of the woman. At step 1710, the woman completes the smart contract and retrieves the money by scanning her biometric information.

Figure 18:
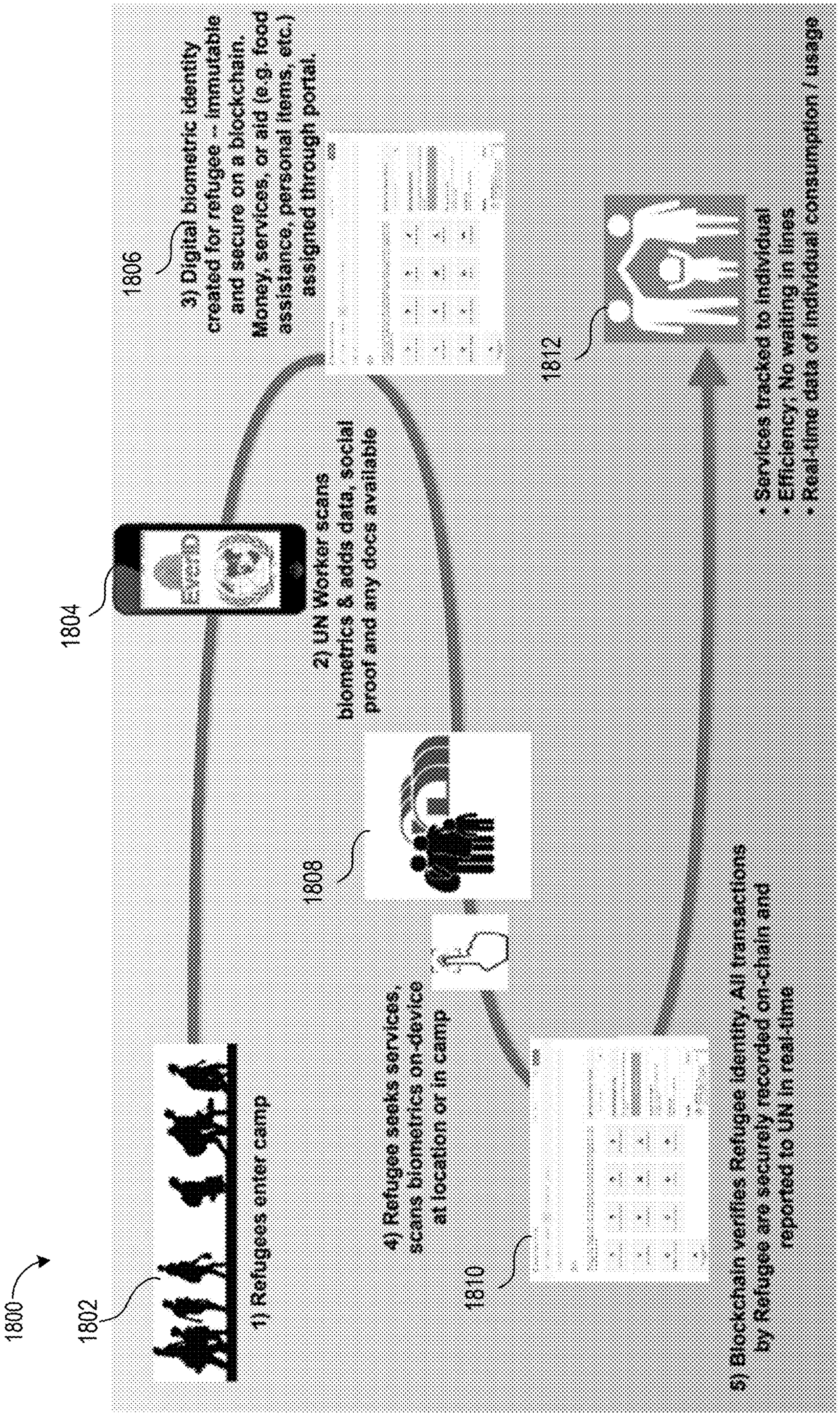
FIG. 18 illustrates a flowchart of refugee camp registering and verifying refugees that may be implemented by the system in FIG. 5 according to an example embodiment.

Referring to FIG. 18, FIG. 18 is a flow diagram 1800 of refugees being tracked and cared for with an implementation of the disclosed subject matter. At step 1802, refugees enter a camp. At step 1804, a UN worker scans the biometrics of the refugee using a third-party device 570 and scans the refugee's identity information with proof of social security and any other identity documentation that the refugee possesses. At step 1806, a digital biometric identity is created for the refugee. The digital biometric identity is immutable and secure on a blockchain. Money, services, or aid such as food, assistance, and personal items are assigned to the refugee through a digital portal. At step 1808, the refugee seeks services and scans biometric data onto a device on-location at the refugee camp. At step 1810, the blockchain verifies the refugee identity. All transactions by the refugee are securely recorded on a transaction blockchain and reported to the UN in real time. At step 1812, services are tracked to the individual efficiently with no waiting in lines. The data for individual consumption of refugees is tracked in real time.

Decentralized identity registration and verification can be applied to Refugees camps in order to register identification, send aid, and track the individual consumption and usage. Once refugees enter the refugee camps, the United Nations worker scans the individual's biometrics and adds the data, social proof, and any other documents available. The United Nations worker may use a third-party device 570, which scans the biometric information and inputs from a user and sends the data onto the third-party device 570. The third-party device 570 that includes a smart contract generator 578. In various embodiments, the third-party device 570 generates the refugee data and information through the user data receiver processor 576. Then, the third-party device 570 sends the encrypted data onto the decentralized distributed network 550 through the smart contract generator 578. Once the decentralized distributed network 550 decrypts the data, the super node server 530 creates a new user block in the identify blockchain and secures the data onto the identity blockchain 536.

When in need, refugees can go to the refugee camp location which may be a third party, and seek services and request help. Upon requesting services, the refugees must scan biometrics on the third-party device 570. The third-party device 570 analyzes the data through the user data receiver processor 576. The third-party device 570 generates an encrypted verification request to the decentralized distributed network 550. This encrypted request is executed through the verification request generator 574 and the smart contract generator 578 inside the third-party device 570. Once the decentralized distributed network 550 decrypts the data, the super node server 530 verifies the refugee's identity by searching the identity blockchain 536 to determine which one of the user blocks 538 belongs to the refugee that is requesting the help. Upon verifying and identifying the user block 538, the decentralized distributed network 550 confirms the information verification component 564, and informs the third party by sending authentication to the third-party device 570. Upon the refugee being verified, the refugee's request is fulfilled by the third party.

Figure 19:
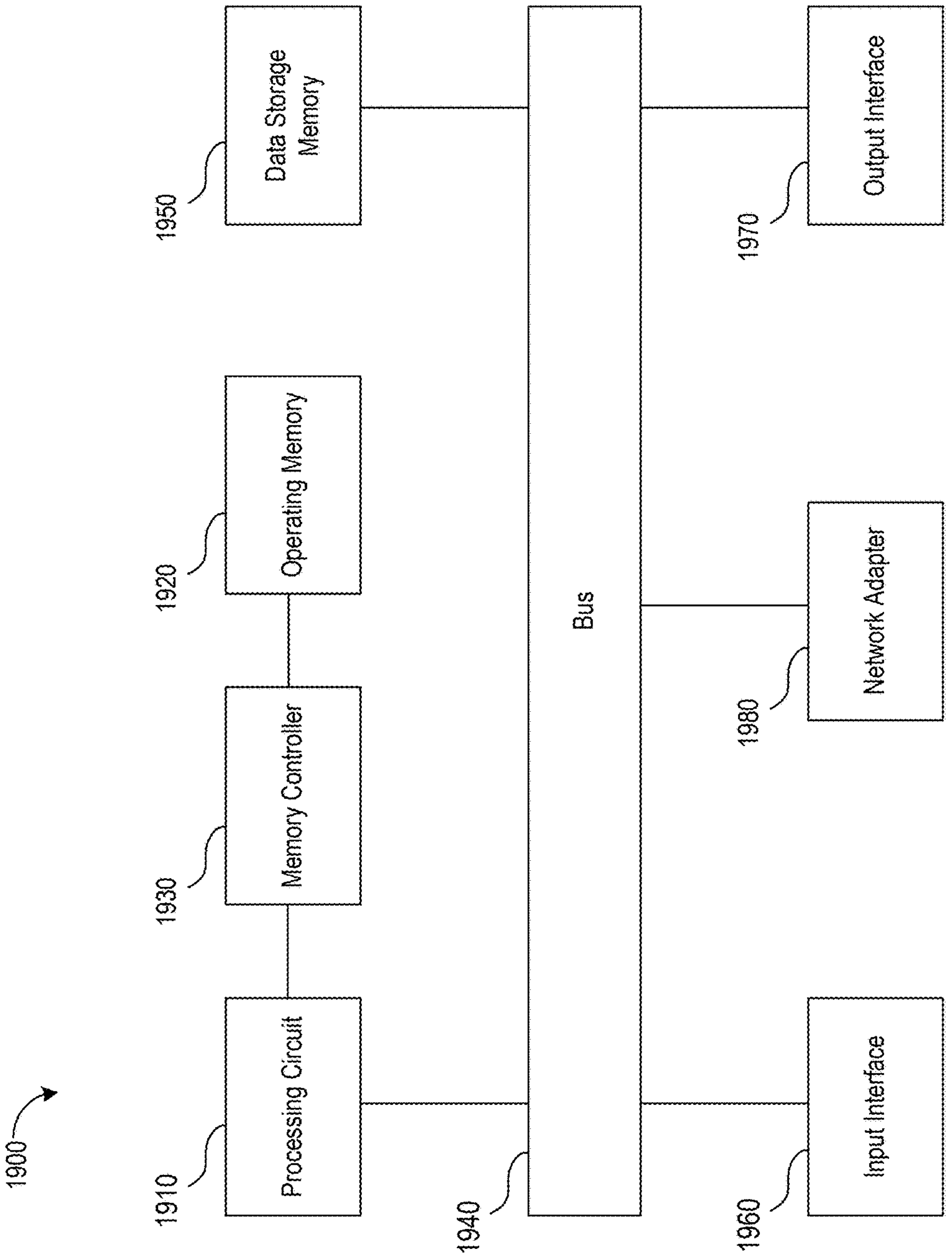
FIG. 19 is a schematic diagram of a computer system.

Referring to FIG. 19, FIG. 19 is a diagram illustrating one example of a computing device 1900 in which embodiments and implementations of the disclosed subject matter may be practiced. The computing device 1900 may be almost any type of general or specific-purpose computer including, but not limited to: a desktop computer, a laptop computer, a tablet computer, a server computer, a virtual computing host computer, a display device, a camera, a printer, or a smartphone.

As shown in FIG. 19, the computing device 1900 includes a processing circuit 1910, operating memory 1920, a memory controller 1930, data storage memory 1950, an input interface 1960, an output interface 1970, and a network adapter 1980. Each of these components has a hardware element.

The computing device 1900 includes one or more processing circuits 1910 that executes instructions, such as the instructions for implementing the described subject matter. The processing circuit 1910 may include a microprocessor, a microcontroller, a graphics processor, a coprocessor, a field-programmable gate array, a programmable logic device, a signal processor, or any other circuit suitable for processing data. A bus 1940 connects the processing circuit to the other components of the computing device 1900. The instructions and data, such as datasets, metadata, and operating system instructions, may be stored in operating memory 1920 while the computing device 1900 is running. The operating memory 1920 may also include data storage devices or components, such as volatile memory, semi-volatile memory, random access memory, static memory, caches, buffers, or other media used to store information while the computing device 1900 is running. In one example, where the operating memory 1920 does not retain data when the computing device 1900 is not running, the computing device 1900 may be configured to transfer instructions from a non-volatile data storage component, such as the data storage memory 1950, to operating memory 1920 as part of a booting or other loading process.

The operating memory 1920 may be double data rate forth generation (DDR4) memory, double data rate third generation (DDR3) memory, other dynamic random access memory (DRAM), High Bandwidth Memory (HBM), Hybrid Memory Cube memory, 3D-stacked memory, static random access memory (SRAM), or other memory. The operating memory 1920 may comprise one or more memory circuits integrated onto a dual inline memory module (DIMM), a single inline memory module (SIMM), a small outline dual inline memory module (SODIMM), or another type of packaging. The construction of operating memory modules or devices may be organized based on channels, ranks, and banks. In one example, the operating memory device may be linked to the processing circuit 1910 via a memory controller 1930 in channels.

The memory controller 1930 interfaces the processing circuit 1910 to the operating memory 1920. The memory controller 1930 may be configured to relay commands, addresses, and data between the operating memory 1920 and the processing circuit 1910. The data storage memory 1950 is non-volatile and used for long-term data storage. The components of data storage memory 1950 can non-volatile memories, disks, disk drives, hard drives, solid-state drives, or any other media that can be used for the non-volatile storage of information.

Persons skilled in the art will recognize that many modifications and variations are possible in the details, materials, and arrangements of the parts and actions which have been described and illustrated in order to explain the nature of this inventive concept and that such modifications and variations do not depart from the spirit and scope of the teachings and claims contained therein.

All patent and non-patent literature cited herein is hereby incorporated by references in its entirety for all purposes.

The invention claimed is:

1. A method comprising:

receiving, by one or more super node servers in a decentralized distributed network, a verification request for verification data of a user from a third party device associated with a bank, the verification request being generated based on input from a third party;

wherein the verification request comprises a seed information regarding the user;

searching, by the one or more super node servers in response to the verification request, a distributed identity blockchain for a block comprising information related to the user;

determining, by the one or more super node servers, based on the search, a matching user block in the distributed identity blockchain using the seed information;

generating, by the one or more super node servers, a permission request to one or more device nodes corresponding to the matching user block based on the determination, wherein the permission request comprises asking the one or more device nodes for permission to share the verification data based on the seed information;

responsive to receiving an approval from the one or more device nodes to share at least a portion of the verification data, the one or more super node servers sends at least the portion of the verification data to the third party device;

receiving, from the third party device, a smart contract generated by the third party device, the smart contract being generated using the verification data and comprising transaction details including the seed information and an amount associated with conditional tokens;

creating, by the one or more super node servers in response to the smart contract, a new transaction block on a distributed transaction blockchain, the new transaction block corresponding to allocation of conditional tokens associated with the matching user block;

receiving, from a user device associated with the matching user block, a request to transfer at least a portion of the conditional tokens to a third party device associated with an enterprise;

receiving, from the third party device associated with the enterprise, another smart contract configured to redeem the conditional tokens;

verifying, by the one or more super node servers using the distributed identity blockchain and the distributed transaction blockchain, the matching user block and validity of the conditional tokens; and executing, by the one or more super node servers, the other smart contract to redeem the conditional tokens from the bank.

2. The method of claim 1, further comprising receiving, by the one or more super node servers, at least one identification information from the user;

further comprising receiving, by the one or more super node servers, at least one government identification information about the user from government issued documents;

further comprising receiving, by the one or more super node servers, at least one non-government identification information about the user from non-government issued electronic accounts; and further comprising storing the at least one identification information, the at least one government identification information and the at least one non-government identification information on a distributed blockchain network on the one or more super node servers and the one or more device nodes.

3. The method of claim 2, wherein the at least one identification information comprises at least one of biometric information, name, address, phone number, social media identifier, personal identification number, photographs of the user;

wherein the at least one government identification information comprise at least one of passport, driver license, birth certificate, graduation certificate; and wherein the at least one non-government identification information comprises at least one of online network information and online retailer information.

4. The method of claim 2, wherein the verification request comprises at least one of the identification information and at least one of the government identification information.

5. The method of claim 2, further comprising:

upon detecting that the one or more device nodes is located away from a first super node server of the one or more super node servers to be closer in distance to a second super node server of the one or more super node servers, transferring the at least one identification information, the at least one government identification information, and the at least one non-government identification information to the second super node server.

6. The method of claim 1, wherein the seed information comprises a name of the user and a public key of the user.

7. The method of claim 1, further comprising sharing, by the one or more super node servers the verification data upon receiving the approval from the one or more device nodes.

8. The method of claim 1, further comprising generating a display on the one or more device nodes comprising a selectable summary of the verification data to permit the user to approve or disapprove a sharing of the verification data.

9. The method of claim 1, further comprising at least one board member server that validates user information that corresponds to each board member server information in the one or more super node servers and the one or more device nodes.

10. The method of claim 1, wherein the distributed transaction blockchain comprises multiple immutable nodes that each include transaction information.

11. The method of claim 10, wherein the distributed identity blockchain comprises multiple identity nodes, one of the multiple identity nodes comprising:

at least one identification information from the user;

at least one government identification information about the user from government issued documents;

at least one non-government identification information about the user from non-government issued electronic accounts.

12. The method of claim 11, wherein the transaction information includes a link to at least two nodes in the identity blockchain.

13. The method of claim 1, wherein the distributed transaction block chain comprising multiple immutable transaction nodes that each comprise transaction details that were generated by the smart contract.

14. The method of claim 1, wherein the verification request is encrypted, and wherein the one or more super node servers decrypt the verification request.

15. The method of claim 1, further comprising registering the user to an identity management portal such that the user can access different service providers without having an electronic mobile device or possessing a physical identity document at the time of access.

* * * * *